US012737396B2

(12) United States Patent
Bright et al.

(10) Patent No.: US 12,737,396 B2
(45) Date of Patent: Sep. 15, 2026

(54) VALIDATION FRAMEWORK FOR QUESTION-AND-ANSWER SYSTEMS

(71) Applicant: Hasbro, Inc., Pawtucket, RI (US)

(72) Inventors: Gray Bright, Cranston, RI (US); Joseph P. Bradford, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 121 days.

(21) Appl. No.: 18/927,768

(22) Filed: Oct. 25, 2024

(65) Prior Publication Data

US 2025/0139139 A1 May 1, 2025

Related U.S. Application Data

(60) Provisional application No. 63/546,152, filed on Oct. 27, 2023.

(51) Int. Cl.
*G06F 16/3329* (2025.01)
*G06F 3/04815* (2022.01)
*G06F 40/35* (2020.01)

(52) U.S. Cl.
CPC ...... *G06F 16/3329* (2019.01); *G06F 3/04815* (2013.01); *G06F 40/35* (2020.01)

(58) Field of Classification Search
None
See application file for complete search history.

(56) References Cited

U.S. PATENT DOCUMENTS

| | | | | |
|---|---|---|---|---|
| 12,111,859 | B2 * | 10/2024 | Siebel | G06F 16/3326 |
| 2019/0022545 | A1 | 1/2019 | Gunawardana | |
| 2023/0259705 | A1 * | 8/2023 | Tunstall-Pedoe | G06F 40/279 704/9 |
| 2025/0032945 | A1 | 1/2025 | Mechlowicz | |
| 2025/0047753 | A1 * | 2/2025 | Lettunich | G06Q 10/40 |

OTHER PUBLICATIONS

Rebedea et al., "NeMoGuardrails: A Toolkit for Controllable and Safe LLMApplications with Programmable Rails", Oct. 16, 2023 (Year: 2023).*

* cited by examiner

*Primary Examiner* — Nafiz E Hoque
(74) *Attorney, Agent, or Firm* — Ashurst Perkins Coie US LLP; Colin Fowler; Willa Wu

(57) ABSTRACT

The technology discloses a system for validation of generative AI model operators using preloaded query context connected to independent AI models in generative AI-driven trivia gameplay. The system includes a user interface connected to a generative AI model that generates trivia responses based on user input. A model superstructure between the user interface, the generative AI model, and independent validation model(s) facilitates the evaluation of the user input or trivia response by the validation model(s). The validation model(s) are provided with a pre-loaded query context to detect adherence to predetermined conditions. A consensus module receives the validation model's output and delivers the user input or trivia response to the generative AI model or user interface, respectively, based on the evaluation.

20 Claims, 12 Drawing Sheets

VALIDATION FRAMEWORK FOR QUESTION-AND-ANSWER SYSTEMS

CROSS-REFERENCE TO RELATED APPLICATION(S)

The present application claims the benefit of U.S. Provisional Patent Application No. 63/546,152, filed Oct. 27, 2023, the entirety of which is incorporated herein by reference.

BACKGROUND

Artificial intelligence ("AI") models often operate based on extensive and enormous training models. The models include a multiplicity of inputs and how each should be handled. Then, when the model receives a new input, the model produces an output based on patterns determined from the data the model was trained on.

Large language models ("LLMs") are trained using large datasets to enable them to perform natural language processing ("NLP") tasks such as recognizing, translating, predicting, or generating text or other content. One example of an existing LLM is ChatGPT. A recent trend in AI is to make use of general-purpose generative AI applications built on LLMs. An example of such an application is the ChatGPT family of OpenAI models. The general-purpose generative AI applications make use of a natural language chat interface for humans to make requests to the LLM. At the time of filing, general-purpose generative AI's initial attempt at responding to a user's queries is middling and requires query refinement from the user. Over the course of a given chat session, the user refines their queries (e.g., by rephrasing or specifying details), and the general-purpose model provides a more accurate and relevant response.

DETAILED DESCRIPTION

Figure 1:
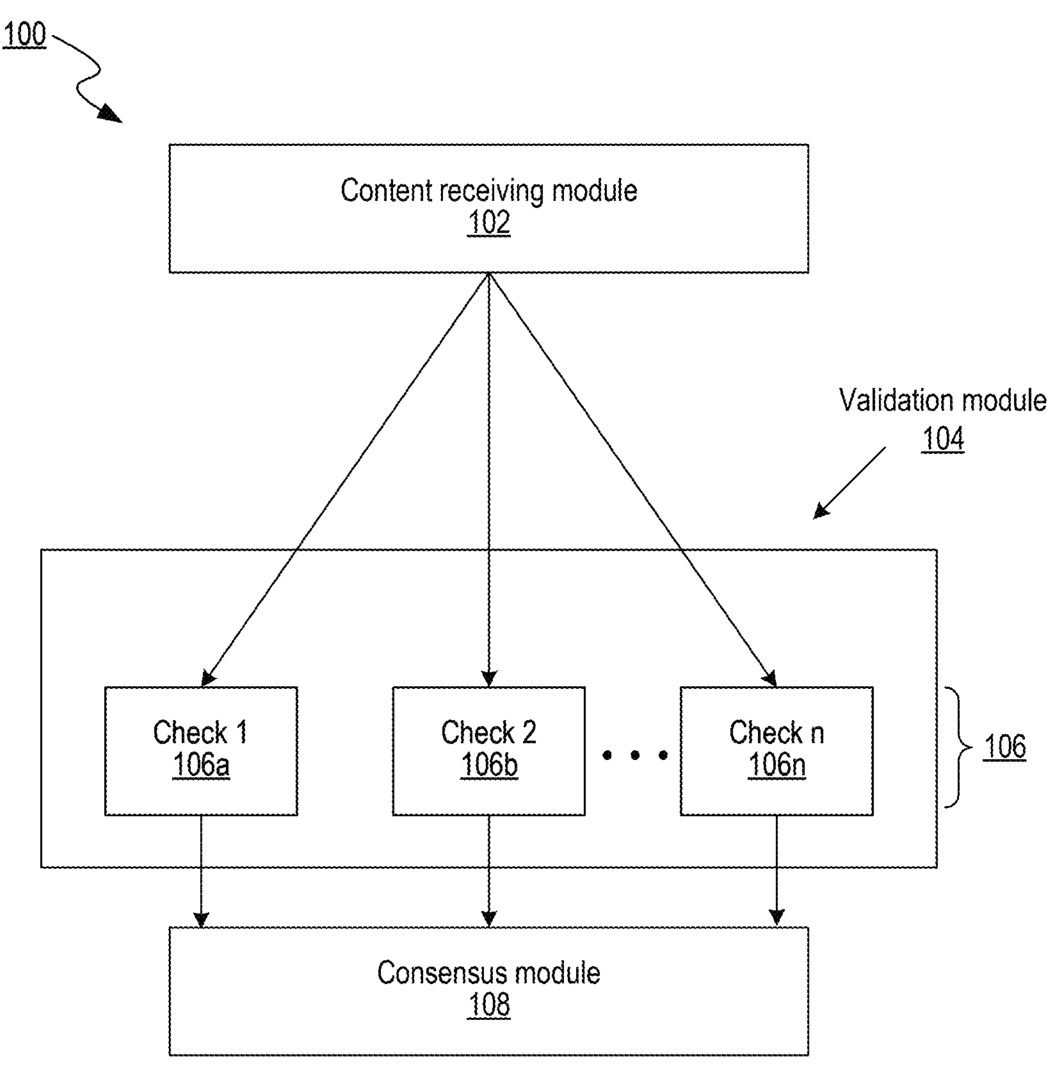
FIG. 1 is a diagrammatic view illustrating generally a validation process in accordance with the invention.

Tabletop games have been popular forms of entertainment, each offering distinct experiences. The integration of generative AI technology enables a unique and dynamic gameplay experience. For example, AI technology can be harnessed to produce an extensive range of questions, prompts, and Ouija board responses based on diverse input data. An AI engine formulates trivia questions based on input parameters, such as category, difficulty level, and desired question format (multiple choice, true/false, open-ended, etc.). The output questions are expected to challenge participants while ensuring clarity and coherence. Similarly, an AI engine generates responses for the Ouija board sessions, designed to facilitate play. The responses are influenced by the context of the game and are customizable to align with different paranormal themes.

However, there is the potential for erroneous, misleading, or otherwise undesirable, responses from the generative AI engine. The errors arise from various sources, such as inaccuracies in the training data, limitations in the model architecture, and/or the probabilistic nature of AI predictions. For example, the generative AI engine may lack the ability to verify the veracity of statements made by users. Without verification, the generative AI engine may generate responses based on false information provided by users. Another example occurs when the training data used to develop the generative AI engine contains biases or skewed representations. In that case, the generated content may inadvertently reflect those biases, potentially leading to inappropriate or inaccurate responses. Additionally, if the generative AI engine encounters a situation where the generative AI engine lacks adequate information to generate a response, the generative AI engine will attempt to infer or guess, potentially leading to inaccurate content. Another concern is when users provide input that is unconventional, vague, or entirely unrelated to the intended context, which challenges the generative AI engine's ability to generate appropriate responses. Input as described can be due to an attempt to jailbreak the generative AI engine, a form of hacking that aims to bypass an AI model's ethical safeguards and elicit prohibited information.

Even in potentially favorable circumstances, a generative AI typically provides what a user asks for in a literal sense and does not accommodate for what the user really wants to know. Humans will provide imprecise input that receives similarly imprecise output. For example, a human will request trivia questions on a certain topic, and the generative AI will take the path of least computation and provide a set of nearly identical, but technically different questions. The human did not specify that the questions needed to be varied, and the model accordingly did not vary them. Further, a user can only do so much with a given query. Queries to generative models typically have character maximums, or query buffers of a limited size in order to control execution speed. In such circumstances, a user's input may only be as specific as the query buffer allows.

In addition to being procedurally inefficient, using generative AI models for gameplay also results in another technical problem: the black-box nature of many AI models, where the internal workings of the model are not transparent. The opacity makes it difficult to understand and mitigate errors of the response. For example, a black-box model may make a decision based on spurious correlations in the data, but without insight into the model's reasoning process, it is challenging to identify and correct these errors.

The technical problem is further compounded due to AI models operating on a next-best-token framework. The next-best-token framework predicts the next word or token in a sequence by considering the preceding words or tokens. For example, the AI model calculates the probability distribution over the possible next tokens and selects the one with the highest probability as the next output. The next-best-token framework may lead to outputs that deviate from the intended path because the model's decisions are based on local probabilities rather than a global understanding of the overall context or the user's ultimate goal. For example, if an AI model is asked to generate a story and the AI model encounters a vague prompt, the model may start generating content that diverges significantly from the user's intended narrative. The AI model may continue with a common or statistically likely sequence, but the sequence may not align with the specific direction or theme the user had in mind. Therefore, the next-best-token framework may struggle with maintaining long-term coherence and consistency in the generated text, as the framework focuses on immediate token predictions rather than the overall narrative structure.

Human intervention to correct the errors in the undesirable responses of the AI model is impractical, especially in real-time applications where quick/immediate responses are required. For example, in live gameplay, the immediacy and flow of interaction substantially affect the user experience. In trivia games, players expect rapid-fire questions and answers to maintain the pace and excitement of the game. If an AI model generates an incorrect or misleading question, waiting for a human to review and correct the question disrupts the flow of the game, causing frustration among players. Similarly, in Ouija board sessions, users interact with the AI in a continuous and fluid manner, seeking immediate responses to their queries. If the AI produces an inappropriate or nonsensical response, pausing the interaction for human correction would break the immersive experience and reduce the effectiveness of the application. Moreover, the volume of interactions in these gameplay scenarios is substantial due to multiple users engaging with the AI simultaneously.

To address the technical problems in AI-generated content, the validation framework seeks to ensure the accuracy, relevance, and reliability of AI-generated content in any game system, such as a trivia or Ouija board game system. To achieve these goals in a practical, automatic, and substantially real-time manner, the validation framework employs AI (or other heuristic check) watching AI. By upholding these criteria, the validation mechanism maintains user trust and creates a consistent gameplay experience.

The validation process is orchestrated by an amalgamation of distinct AI models, each tailored to address specific facets of content assessment. The AI models are integrated within an architectural superstructure that allows for synchronized execution. The architectural superstructure facilitates the parallel execution of independent validation models. The independent validation models use pre-loaded query context to validate specific checks pertaining to the use of a main model (e.g., a generative AI model, GenAI, GAI). The pre-loaded query context functions as parameters that guide the distinct AI models in discerning compliance with predetermined model-driven conditions that limit undesirable input and output to/from the main model. The pre-loaded query context enables the system to dynamically adapt system validation criteria based on the unique characteristics of both the main model and the user input.

The validation framework enables various additional technical advantages. For example, the validation framework addresses the potential for erroneous, misleading, or otherwise undesirable responses from the generative AI engine by implementing multiple layers of validation on both the user input and the model output. For example, accuracy checks cross-reference the AI's responses with external knowledge databases and sources to ensure the accuracy of the information provided. Bias checks identify and mitigate biases present in the training data, reducing the likelihood of generating biased or skewed content. When the AI engine encounters situations where the AI engine lacks adequate information, the validation framework flags the instances and requests additional input from the user and/or provides a disclaimer about the potential uncertainty of the response.

Further, the validation framework mitigates limitations of the next-best-token framework by using a global context to validate the response of the AI engine. By weaving together multiple validating models that operate in parallel, the validation framework ensures that each token prediction is checked against a broader context (e.g., the entire response, geographical location, time period, and so forth) defined by the multiple validating models. The validation framework validates the consistency of the AI's responses over extended interactions. The parallel validation is particularly advantageous for live gameplay, since the parallel structure enables the system to process multiple aspects of validation concurrently and thus reducing latency that would occur from validating the content against each aspect one at a time. Each model operates independently but is managed by a consensus module that determines the overall validity of the content by aggregating the results from the various validation models. Using the validation framework, a larger amount of content (e.g., trivia questions) can be generated over a shorter period of time.

While the present validation framework is described in detail for use with trivia (such as Trivial Pursuit) or Ouija board game systems, the validation framework could be applied, with appropriate modifications, to improve the playability of other applications, making the validation framework a valuable tool for diverse applications beyond trivia games and supernatural communication sessions. The examples provided in this paragraph are intended as illustrative and are not limiting. Any other game referenced in this document, and many others unmentioned are equally appropriate after appropriate modifications.

The invention is implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description that references the accompanying figures follows. The scope of the invention is limited only by the claims and the invention encompasses numerous alternatives, modifications, and equivalents. Numerous specific details are set forth in the following description in order to provide a thorough understanding of the disclosure. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 is a diagrammatic view illustrating generally a validation framework 100. The validation framework 100, in some embodiments, has a content receiving module 102 that receives inputs from a user or outputs from a model. In some embodiments, the content receiving module 102 receives an output of a generative AI engine comprising of neural network-based architecture, such as an LLM. The output of the model, in some embodiments, is in a string format. However, in scenarios where JavaScript Object Notation ("JSON") formatting is required, the configuration is specified within the pre-loaded query context. As is described in greater detail below, in the context of a trivia game, the content receiving module 102 receives a topic request from a user in some embodiments. In other embodiments, in the context of a trivia game, the content receiving module 102 receives the output from a generative AI engine, wherein the output is in the form of at least a trivia response (both correct and incorrect). A trivia response specifically pertains to the entirety of one or more trivia questions and the corresponding set of multiple-choice answers and/or schedule of accepted answers (in view of short answer or fill-in-blank type trivia).

The data received by the content receiving module 102 is transmitted into a validation module 104. In some embodiments, the validation module includes a validation model 106. In some other embodiments, the validation module includes a plurality of validation models, 106*a*, 106*b*, and so on through 106*n*, for a total of n models, where n equals the number of validation models. The data received by the content receiving module 102 is validated through the validation model(s) 106*a* through 106*n*. In some embodiments, the data is validated by the validation model(s) 106*a* through 106*n* in tandem using a parallel data processing mechanism. In some embodiments, the parallel data processing mechanism includes running a plurality of central processing units ("CPUs") concurrently on a single system, where the system distributes the computational load across multiple processors.

Each of the validation model(s) 106*a* through 106*n* reviews some predefined aspect of the input to the content receiving model 102. A distinctive element of each of the validation model(s) 106*a* through 106*n* is pre-loaded query context that is employed along with the input to the content receiving model 102. In some embodiments, the validation model(s) 106*a* through 106*n* employ varied model architecture and training sets. In some embodiments, the same model architecture and training set is employed for the validation model(s) 106*a* through 106*n*.

In some embodiments, one of the validation models 106*a* through 106*n* includes a topic check. The topic check is pre-loaded with a query context that encompasses a list of prohibited topics, encapsulated in a structured data format such as JSON. The topic check identifies and/or denies content (e.g., queries from the user, responses from the AI engine). In some embodiments, support vector machines ("SVM") are used to classify whether the content belongs to a certain category (e.g., permissible or impermissible content). For example, the validation model 106*a* through 106*n* of the topic check is trained on a dataset that includes examples of permissible and impermissible content to enable the validation model 106*a* through 106*n* to learn the distinguishing features of each category. In some embodiments, the topic check extracts semantic (e.g., using word embeddings), syntactic (e.g., using part-of-speech taggings or dependency parsing), and contextual features (e.g., using attention mechanisms in transformer models) from textual data to enable the model (e.g., the SVM) to distinguish between permissible and impermissible content.

For example, a trivia game under a particular configuration is not interested in including questions about serial killers. The topic block is approachable either explicitly (e.g., the user asked for questions about serial killers) or implicitly (e.g., the user asked for questions about a specific person who fits the definition of serial killer). However, a given topic requested may be "The Silence of the Lambs," a film that concerns a fictional serial killer, Hannibal Lecter. In such a circumstance, in some embodiments, a fictional or entertainment-related bypass is enabled by framing the topic check as to whether the trivia question is more related to the prohibited topic (e.g., serial killers) or more related to an allowed topic (e.g., entertainment and film).

In some embodiments, topic checks are executed individually and in parallel (e.g., each topic, serial killers or otherwise, is independently evaluated), and in some embodiments, multiple topics are screened simultaneously with one set of pre-loaded query context. A similar principle applies to other validation models 106*a* through 106*n* described below.

In some embodiments, one of the validation models 106*a* through 106*n* includes a localization check. The pre-loaded query context for the localization check includes geospatial data in a standardized format. The geospatial data includes latitude and longitude coordinates, country codes, region identifiers, and/or other location-specific information. Through geospatial algorithms, the model assesses whether the generated content remains relevant and appropriate for the geographic location of the users or user profiles initiating the query, using techniques such as coordinate-based calculations and geofencing. For example, the validation model 106*a* through 106*n* uses geofencing to check if the user's location falls within a predefined area, such as a city, state, or country, by defining a polygonal boundary using a series of latitude and longitude points and determining if the user's coordinates lie within this polygon.

Appropriateness is structured either as cultural awareness or cultural taboo. In such cases, the pre-loaded query context includes variables that are determined by the location of the user (e.g., language preferences, religious practices, social etiquette, historical context). An example pre-loaded query context is "Is topic X (as received from the user input) a polite topic for general discussion in Geographic region Y (country, state, metro area, etc. of the user)." Or similarly, "Is topic X (as received from the user input) something that people in Geographic region Y (country, state, metro area, etc. of the user) are familiar enough for a trivia question of difficulty Z (easy, medium, hard, etc.)."

In some embodiments, one of the validation models 106*a* through 106*n* includes a hallucination check. The pre-loaded query context for the hallucination check specifies parameters for evaluating data veracity and coherence to enable the check to use techniques such as sequence-to-sequence modeling and attention mechanisms. If the model detects a deviation from established criteria, indicating potential hallucination (i.e., generating information that is not based on the input data), the model interrupts the current output generation process and invokes the generative AI engine to restart. The hallucination check operates on the premise that generative AI output is produced on a per-character basis where the AI is predicting the next character in a given output as the output is being produced. Interrupting the main model, or requesting the main model start again from the middle of a given output causes the model to re-evaluate a given output from an intermediate position of the output (e.g., "try again from here") and reduces model hallucination.

In some embodiments, one of the validation models 106*a* through 106*n* includes a profanity check. In some embodiments, profanity check integrates NLP techniques like part-of-speech tagging and sentiment analysis and is equipped with a pre-loaded query context that includes a comprehensive list of profane language and associated indicators. Part-of-speech tagging assigns a part of speech (e.g., noun, verb, adjective) to each word in a sentence based on the word's definition and surrounding context to identify the grammatical structure of the text. Sentiment analysis determines the emotional tone behind a body of text to gauge the likelihood of the content inducing profane language. The pre-loaded query context enables the profanity check to identify instances of profanity within the generated content or determine the likelihood for the content to provoke profane responses.

In some embodiments, one of the validation models 106*a* through 106*n* includes a jailbreak check. The pre-loaded query context for the jailbreak check is tailored to identify instances where a user attempts to manipulate the model by employing obscure or nonsensical queries. In some embodiments, the jailbreak check is accomplished using pattern recognition algorithms or anomaly detection techniques. For example, the jailbreak check identifies regularities and patterns in data and detects unusual or suspicious input patterns that deviate from normal usage, such as repetitive phrases, unusual syntax, or attempts to exploit known vulnerabilities.

An example of a pre-loaded query context employed to avoid jailbreaking is the query, "Is user input X typically considered human comprehensible speech?" Where the expected user input is always expected to be human-comprehensible, user input that is not decipherable by humans is anticipated to be an attempt at jailbreaking the main model.

In some embodiments, one of the validation models 106*a* through 106*n* includes an accuracy check. The pre-loaded query context for an accuracy check evaluates the factual correctness and authenticity of the output generated by the AI engine. In some embodiments, the check parses the generated output, extracts factual claims, and compares the factual claims against a structured database of verified information. For example, a classifier trained on labeled datasets of factual and non-factual statements are used to detect claims using features such as a presence of named entities, specific syntactic patterns, and/or certain keywords or phrases indicative of factual statements. The accuracy check queries the knowledge bases to validate that the generated content aligns with established facts.

An example of a predefined query context employed to determine accuracy is to employ output from one model in a query that requests "Is model output X factually supported?" Where the pre-loaded query context is employed in the context of a trivia game, the output is a question and a set of answers, some of which are intentionally false. In such circumstances, an example pre-loaded query context is, "Does exactly one of the possible answers X factually answer question Y?" Other checks include determining whether each potential answer is distinct from other potential answers. That is, is each available answer distinctive from the other. In some embodiments, the distinctiveness of the answers depends on the intended difficulty of the question. For example, a question that referred to the main antagonist of the Zelda game franchise might refer both to Ganon and Ganondorf. These answers refer to the same individual in different states. A more difficult question would distinguish between the states whereas an easy question should not.

In some embodiments, one of the validation models 106*a* through 106*n* includes a format check. The format check is equipped with a pre-loaded query context that establishes specific formatting standards for the generated content (e.g., proper punctuation, correct capitalization, consistent spacing, and other specified formatting standards). The check ensures that the output from the generative AI engine adheres to these predefined formatting guidelines.

In some embodiments, one of the validation models 106*a* through 106*n* includes a user feedback check. In some embodiments, the pre-loaded query context includes user ratings, comments, preferences, and other relevant feedback elements. In some embodiments, the check leverages user-provided feedback through sentiment analysis (e.g., to determine the overall sentiment (positive, negative, or neutral) expressed by the users) or collaborative filtering techniques (e.g., to predict interests of a user by collecting preferences from other users) to assess the quality and effectiveness of the trivia questions and answers. The user feedback check identifies patterns in user feedback, such as frequently liked or disliked questions. For example, if multiple users rate a question poorly and leave negative comments, the user feedback check refines or replaces the problematic question.

In some embodiments, one of the validation models 106*a* through 106*n* includes a difficulty level analysis check. The pre-loaded query context for the difficulty level analysis check analyzes the complexity of the generated content, ensuring that the generated content aligns with the cognitive capabilities and knowledge levels of the intended users. For example, the difficulty level analysis check uses one or more classifiers (e.g., decision trees) to determine the complexity of content by evaluating various attributes such as vocabulary difficulty, sentence structure, and topic familiarity. In some embodiments, results from different classifiers are aggregated to provide an overall assessment of content difficulty. Each classifier generates a difficulty score based on the classifier's specific criteria (e.g., word length, syntactic complexity, and so forth). The individual scores are aggregated using methods such as weighted averaging, where different weights are assigned to each classifier's score based on the classifier's importance and/or reliability, or a voting mechanism, where each classifier votes on the difficulty level and the final level is determined by the majority vote or other consensus mechanism. For example, if the intended users are middle school students, the difficulty level analysis check rejects questions pertaining to quantum physics.

In some embodiments, one of the validation models 106*a* through 106*n* includes a temporal relevance check. The pre-loaded query context for the temporal relevance check enables the check to evaluate whether the generated content remains pertinent and up-to-date in relation to the prevailing temporal context. In some embodiments, techniques such as temporal analysis or trend prediction algorithms are used. For example, the temporal relevance check examines time-related aspects of the content, such as publication dates, event timelines, and the currency of information, to ensure that the content is still relevant. For example, if the content includes references to technological advancements, the model will verify that the references are current and not outdated. Similarly, for content related to ongoing events, the model will ensure that the information reflects the latest developments.

The validation models 106*a* through 106*n*, each equipped with a distinct pre-loaded query context, validate the data received by the content receiving module 102. The query context dictates which kind of uncertainty or variability the particular validation model is measuring. For example, if the validation models 106*a* through 106*n* included a topic check, localization check, and profanity check, the consensus module 108 will validate the data received by the content receiving module 102 only if the data is not on the deny list of topics, appropriate for the geography of users or user profiles, and does not have instances of profanity, respectively.

Reference to AI models herein employs either platform native models or external application program interfaces (APIs). External APIs (e.g., ChatGPT, MidJourney, Llama, Bard, etc.) are communicatively coupled to a game platform. The pre-loaded query context is initially configured by a game platform. At least in circumstances where the AI models are accessed through external APIs, the pre-loaded query context remains stored with the game platform and is delivered to the validation models 106*a*-106*n* when triggered.

In some embodiments, the consensus module 108 then receives the output of the validation models 106*a* through 106*n* and validates the data received by the content receiving module 102 if the plurality of checks performed by the validation models 106*a* through 106*n* returns a positive result. If any one of the validation models 106*a* through 106*n* returns a negative result, the consensus module 108 will not validate the validation models 106*a* through 106*n*. In some embodiments, the consensus module 108 validates the data received by the content receiving module if the number of positive results exceed a certain threshold (e.g., percentage, number of validation models 106*a* through 106*n*). In some embodiments, each of the validation models 106*a* through 106*n* are assigned a particular weight (e.g., the accuracy check is weighed more heavily than the difficulty check), and the consensus module 108 validates the data based upon the aggregated weight of positive results exceeding a threshold value.

In some embodiments, the consensus module 108 is equipped with a load-balancing algorithm, which dynamically allocates processing resources among the validation models 106*a* through 106*n*. In some embodiments, the load-balancing algorithm takes into account factors such as algorithmic intricacy, data volume, or computational intensity. In some embodiments, the load-balancing algorithm dynamically monitors the current system load by tracking metrics like central processing unit ("CPU") utilization, memory usage, and I/O operations in real-time to make informed decisions regarding the allocation of processing resources. Furthermore, in some embodiments, the algorithm considers the urgency of validation checks. For instance, time-sensitive validations are prioritized over tasks with less immediate relevance, ensuring that critical content assessments are conducted promptly.

In some embodiments, the load-balancing algorithm has knowledge of the volume of data sent and the size of each query, but lacks control over the model's underlying parameters. Thus, the load balancer optimizes the queries in terms of their size, speed, and operations, but cannot directly influence the model's internal workings. In such a case, for example, instead of delivering a batch of ten questions to the validation module 104 at one time, the load-balancing algorithm chooses to send ten separate queries to the validation module 104, one for each question, allowing parallel execution.

In some embodiments, the algorithm takes into consideration the contextual intricacies accompanying each question, gauging factors such as query complexity or time sensitivity. For example, when the user is actively waiting on the generating questions, the system may opt for a more parallelized, one-per-query validation approach such that the game platform delivers questions as each individually becomes cleared/available. Conversely, during moments when the user is preoccupied and the game has available processing time, the load-balancing might choose to validate multiple questions within the same query to a given validation model.

In some embodiments, there is a response mechanism to help the load-balancing algorithm determine the algorithm's course of optimization. Based on an assessment of the query's size and context, and/or a current game state, the response mechanism decides whether it's advisable to divide the query into smaller, more manageable segments. For example, where ten questions are sent for validation, and six of them fail to meet the validation checks 106*a* through 106*n*, a response mechanism is triggered. The time the user takes to answer the four successfully validated questions creates a window of opportunity for the system to generate replacements for the remaining six. In this example, there is potential to process all six replacements simultaneously. However, in a scenario where nine out of ten questions fail the validation checks 106*a* through 106*n*, and only one question buffer is available, a faster approach is warranted. In this case, the system may opt to validate questions one at a time in parallel, ensuring that by the time the user answers all presently available successfully validation questions, there are further successfully validated questions available.

Figure 2:
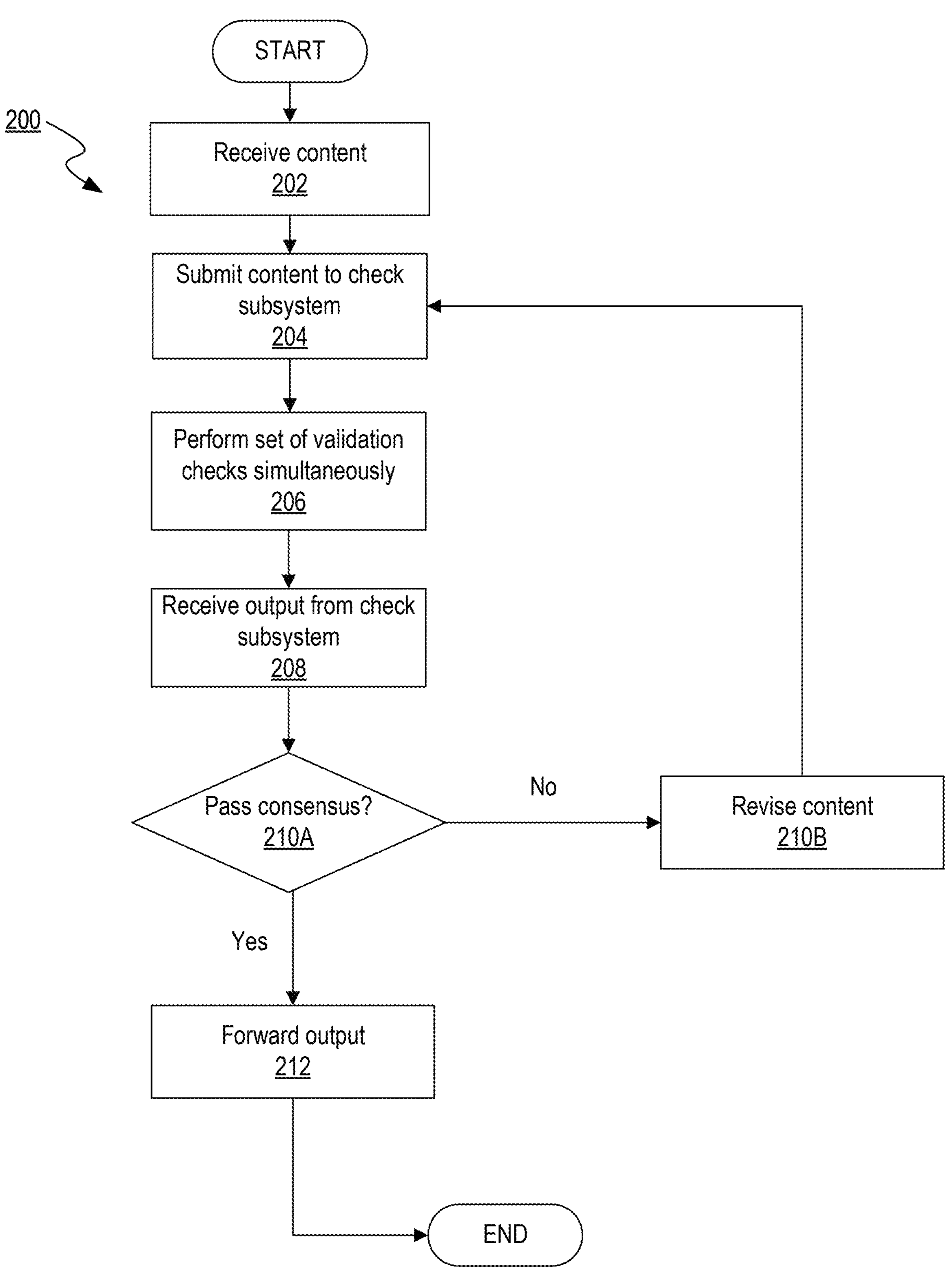
FIG. 2 is a flowchart illustrating a method of performing the validation process in FIG. 1.

FIG. 2 is a flowchart illustrating a method 200 of performing the validation process in FIG. 1. The process initiates with the reception of content in operation 202. In some embodiments, the content consists of either a user-requested topic or a question and the question's corresponding answer. For example, the content is the output of a generative AI engine employing a neural network-based architecture. In some embodiments, the content encompasses the subdivided output of a model. For instance, if the model generates a set of 10 trivia questions, each of these questions is individually subjected to parallel validation, allowing for independent assessment rather than being processed as a collective group, thereby improving processing speed.

Subsequently, the received content is submitted to a check subsystem in operation 204. Once in the check subsystem, operation 206 determines the content's compliance with a predetermined model-driven condition. In some embodiments, the predetermined model-driven condition is predetermined by the pre-loaded query context. For example, a predetermined model-driven condition is that the content cannot fail one or more specific validation checks, such as a hallucination check, profanity check, localization check, and jailbreak check.

A parallel processing mechanism executes a set of independent validation models simultaneously in operation 206 to complete the validation checks, returning the results of the independent validation models in operation 208. By doing so, the system significantly expedites the completion of validation checks, resulting in a streamlined and expeditious assessment of the received content. In some embodiments, the parallel processing mechanism utilizes a load-balancing algorithm that dynamically allocates processing resources among the independent validation models in response to computational demand. In certain embodiments, the load-balancing algorithm takes into account various factors, such as the complexity of the validation models, the current computational load on the system, and the urgency of the validation checks as discussed in further detail with reference to FIG. 1.

In operation 210A, the outputs received from the check subsystem in operation 208 are validated through a decision point (i.e., consensus check performed by consensus module 108 with reference to FIG. 1). In some embodiments, upon encountering a failed consensus check, the content is revised in operation 210B. In one example, the system opts for content discarding. In such embodiments, the game either requests additional content or relies on already available and stored content. Where additional content is requested, the game platform makes use of generative techniques to obtain revised content, such as generative adversarial networks ("GANs") or recurrent neural networks ("RNNs"). In another example, the system prompts alternative validation approaches such as parameter adjustments (e.g., varied query context) to produce revised outputs from the validation models 106*a* through 106*n*. In another example, where the content is a user input, a game GUI signal is issued, signifying the need for new user input.

The revised content generated in operation 210B is then directed back to operation 204. Here, a new iteration of the content generation process is initiated. The revised content is subjected to the same validation process. In instances where the revised content still does not attain consensus, in some embodiments, the system iterates through the re-validation process multiple times until consensus is achieved or a predefined threshold for revision attempts is reached.

Upon successful validation, the content is obtained. Successful validation signifies that the content has met the required criteria. In some embodiments, the content is forwarded to a front-end interface in operation 212. The front-end interface serves as the interface through which the user interacts with the system. In some embodiments, the front-end interface encompasses visual or auditory elements to facilitate user engagement. In operation 212, depending on the specific context and user preferences, the system chooses to disclose either the question or the question's corresponding answer, catering to individual user needs or preferences.

Validating Game Systems

The disclosed architecture is designed to seamlessly integrate with a trivia game environment, ensuring that user-generated inputs align with predefined content guidelines and maintain a high standard of accuracy and relevance. The tailored framework addresses the unique challenges posed by the trivia game context, where the accuracy of questions and answers is paramount to the overall gameplay experience.

Figure 3A:
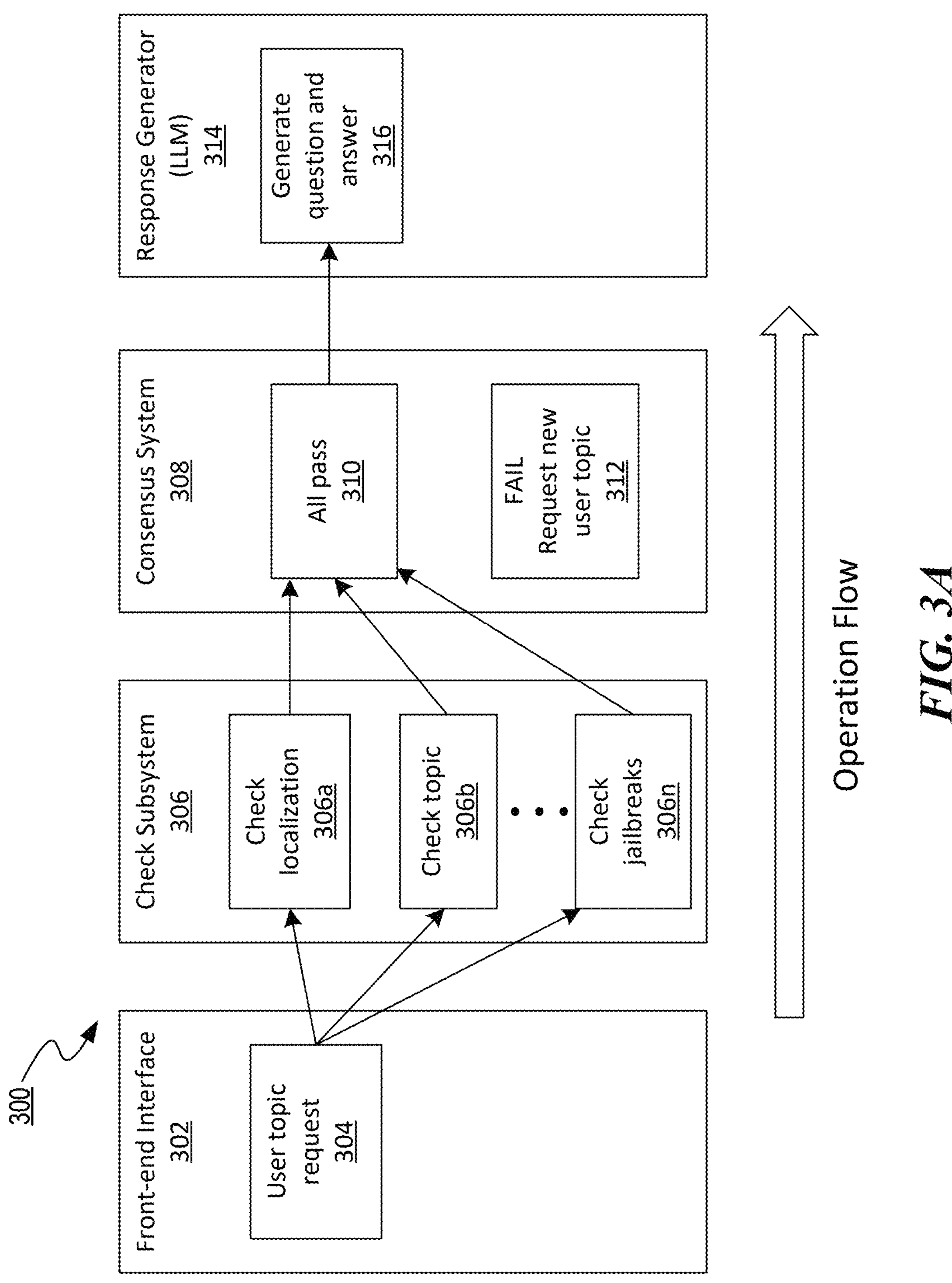
FIG. 3A is a diagram illustrating one embodiment of the architecture of the validation framework as applied to validating language model outputs in a trivia game.

FIG. 3A is a diagram illustrating one embodiment of the architecture of the validation framework 300 as applied to validating user inputs in a trivia game. The validation framework 300 is implemented using components of the example computer system 1100 illustrated and described in more detail with reference to FIG. 11. Implementations of validation framework 300 can include different and/or additional components or can be connected in different ways.

In some embodiments, the validation framework operates beginning with the front-end interface 302. The user will request a topic 304. For example, the user requests a certain topic (e.g., "Kangaroos"). The user-requested topic 304 is validated under a check subsystem 306, which includes, in some embodiments, a validation model 306. In other embodiments, the check subsystem 306 includes a set of independent validation models 306*a* through 306*n*. The set of independent validation models 306*a* through 306*n* each checks the user-requested topic 304 to determine whether the user-requested topic 304 complies with the consensus criteria. In some embodiments, each of the set of independent validation models 306*a* through 306*n* is equipped with the model's own pre-loaded query context.

As described above, in some embodiments, the set of independent validation models 306*a* through 306*n* is executed simultaneously. By leveraging parallel processing, the framework significantly expedites the check subsystem, enhancing the responsiveness of the system. In some embodiments, the parallel processing capability of the architecture is facilitated by concurrent execution threads at each node, leveraging multi-core processing capabilities of the underlying hardware.

Subsequent to the independent validation phase, the user-requested topic 304 is channeled into a consensus system 308. The consensus system 308 ensures that only the user-requested topic 304 that meets the consensus criteria proceeds to the next stage. In some embodiments, there are two possibilities once the user requested topic 304 enters the consensus system 308. The first possibility is that the user-requested topic 304 meets consensus criteria 310. The second possibility is that the user-requested topic 304 fails one or more of the consensus criteria 312. If the user-requested topic 304 meets the consensus criteria 310, the user-requested topic 304 is directed towards the response generator 314. In some embodiments, there is a model superstructure between the response generator 314, the front-end interface 302, and the check subsystem 306. In some embodiments, the front-end interface 302 stands as the initial node, acting as the ingress point for the user topic request 304.

In some embodiments, the response generator 314 includes a neural network-based architecture, such as an LLM. In some embodiments, the response generator is a generative AI model that operates as a deep neural network ("DNN") with multiple layers of long short-term memory ("LSTM") cells. The cells facilitate sequence-to-sequence processing, enabling the model to comprehend and respond to user input with a contextual understanding of various applications, such as trivia games or Ouija board sessions. For example, a response generator 314 generates a question and answer 316 in response to the user topic request 304. On the other hand, if the user-requested topic 304 does not meet the consensus criteria, the consensus system 308 fails and a new topic is requested 312 from the user through the front-end interface 302. For example, in cases where a user includes explicit language or offensive content in their input, the profanity check would identify the content and reject the input. In another example, if a user attempts to bypass the system by inputting a series of random characters, the jailbreak check would recognize the input as an attempt to manipulate the system and prompt a revision.

Figure 3B:
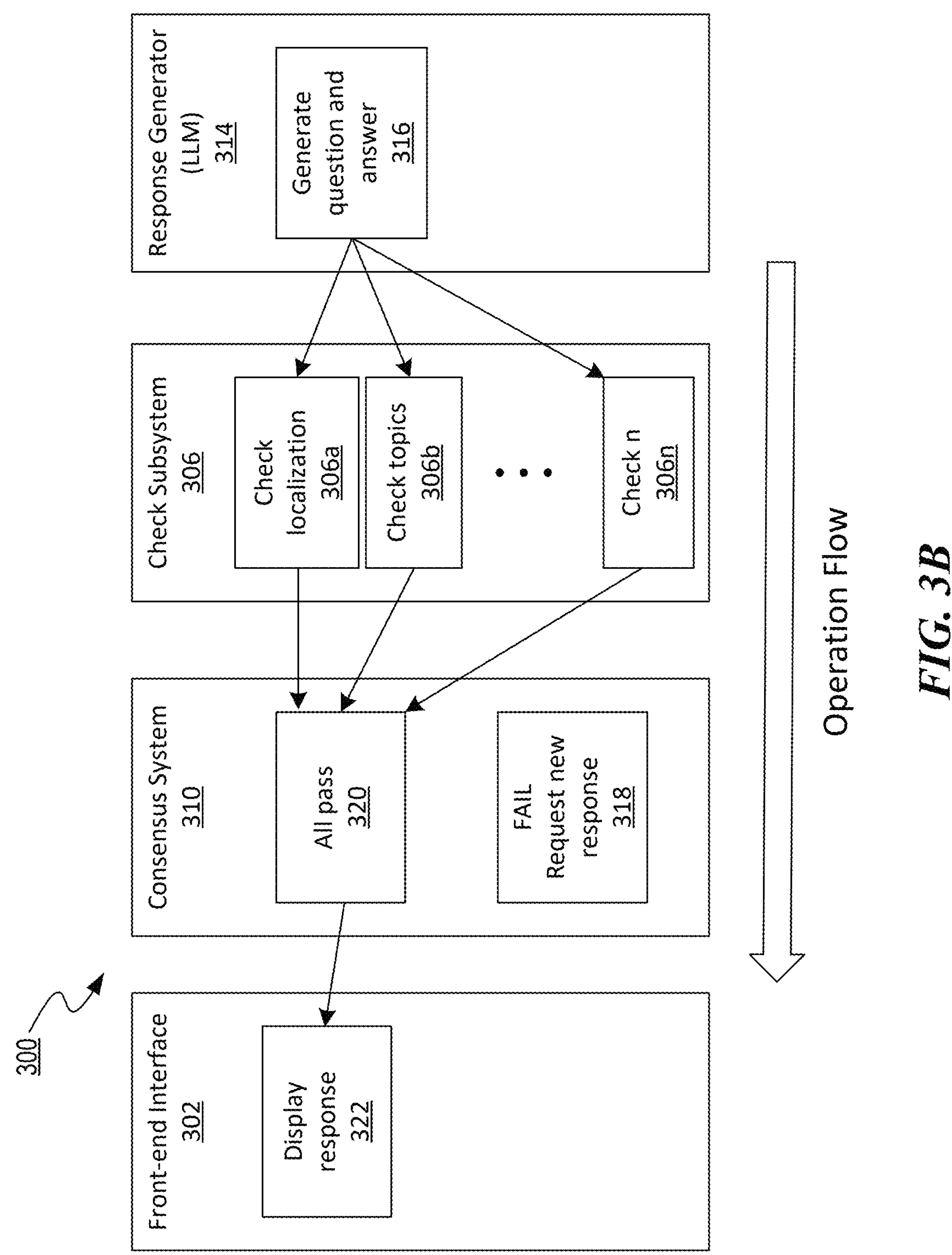
FIG. 3B is a diagram illustrating one embodiment of the architecture of the validation framework as applied to validating user inputs in a trivia game.

FIG. 3B is a diagram illustrating one embodiment of the architecture of the validation framework 300 as applied to validating language model outputs in a trivia game. In some embodiments, there is a model superstructure between, the front-end interface 302, the check subsystem 306, and the response generator 314. In some embodiments, the response generator 314 stands as the initial node, acting as the ingress point for the generated question and answer 316. In some embodiments, the response generator 314 is responsible for generating a question and answer 316. The question and answer 316, in some embodiments, is a generated trivia question and answer using a generative AI engine. The response generator 314 responds dynamically to user requests, creating questions that are pertinent to the specified topics. For example, if the user requests a certain topic (e.g., "Kangaroos"), the response generator 314 will respond with a question related to the user-requested topic (e.g., "What is a group of kangaroos called?"), and also include the answer, ensuring that each question is paired with a correct and contextually appropriate answer (e.g., "Mob").

The generated question and answer 316 is dispatched along the established pathways of the communication structure to the check subsystem 306. In some embodiments, the response generator is a generative AI model that operates as a DNN with multiple layers of LSTM cells. These cells facilitate sequence-to-sequence processing, enabling the model to comprehend and respond to user input with a contextual understanding of various applications, such as trivia games or Ouija board sessions.

The question and answer 316 is then scrutinized under a check subsystem 306, which, in some embodiments, includes one validation model 306. In other embodiments, the check subsystem 306 includes a set of independent validation models 306*a* through 306*n*. The set of independent validation models 306*a* through 306*n* each checks question and answer 316 to determine whether question and answer 316 complies with the consensus criteria. In some embodiments, each of the set of independent validation models 306*a* through 306*n* is equipped with the model's own unique validation capabilities, bolstering the overall assessment process.

As described above, in some embodiments, the set of independent validation models 306*a* through 306*n* is executed simultaneously. By leveraging parallel processing, the framework significantly expedites the check subsystem, enhancing the responsiveness of the system. In some embodiments, the parallel processing capability of the architecture is facilitated by concurrent execution threads at each node, leveraging multi-core processing capabilities of the underlying hardware.

Subsequent to the independent validation phase, the question and answer 316 is channeled into a consensus system 308. The consensus system 308 ensures that only a question and answer 316 that meets the consensus criteria proceeds to the next stage. If the question and answer 316 meets the consensus criteria 310 in block 320, the question and answer 316 is directed toward the front-end interface 302. The front-end interface 302 serves as the bridge between the system and the user, providing a platform for user interaction with the trivia game and displaying the question and answer 322 generated by the question and answer generator 314. In some embodiments, the front-end interface 302 includes visual elements, auditory cues, and user prompts to facilitate a seamless and engaging experience. On the other hand, if the question and answer 316 does not meet the consensus criteria in block 318, the consensus system 308 fails and a new question and answer is requested 316 by the question and answer generator 314 or the user.

For example, if the question and answer generator 314 generates a question and answer 316 asserting that Paris is the capital of Germany, the accuracy check would fail, as the statement is factually incorrect. In another example, if a generated question and answer contains explicit or offensive language, the profanity check would fail. In another example, if the output were to contain fabricated information, such as claiming that unicorns are real animals, the hallucination check would identify the output as false data. In another example, if a user inputs trivia questions suitable for children but receives questions at an advanced academic level, the difficulty level analysis check would fail.

Figure 4:
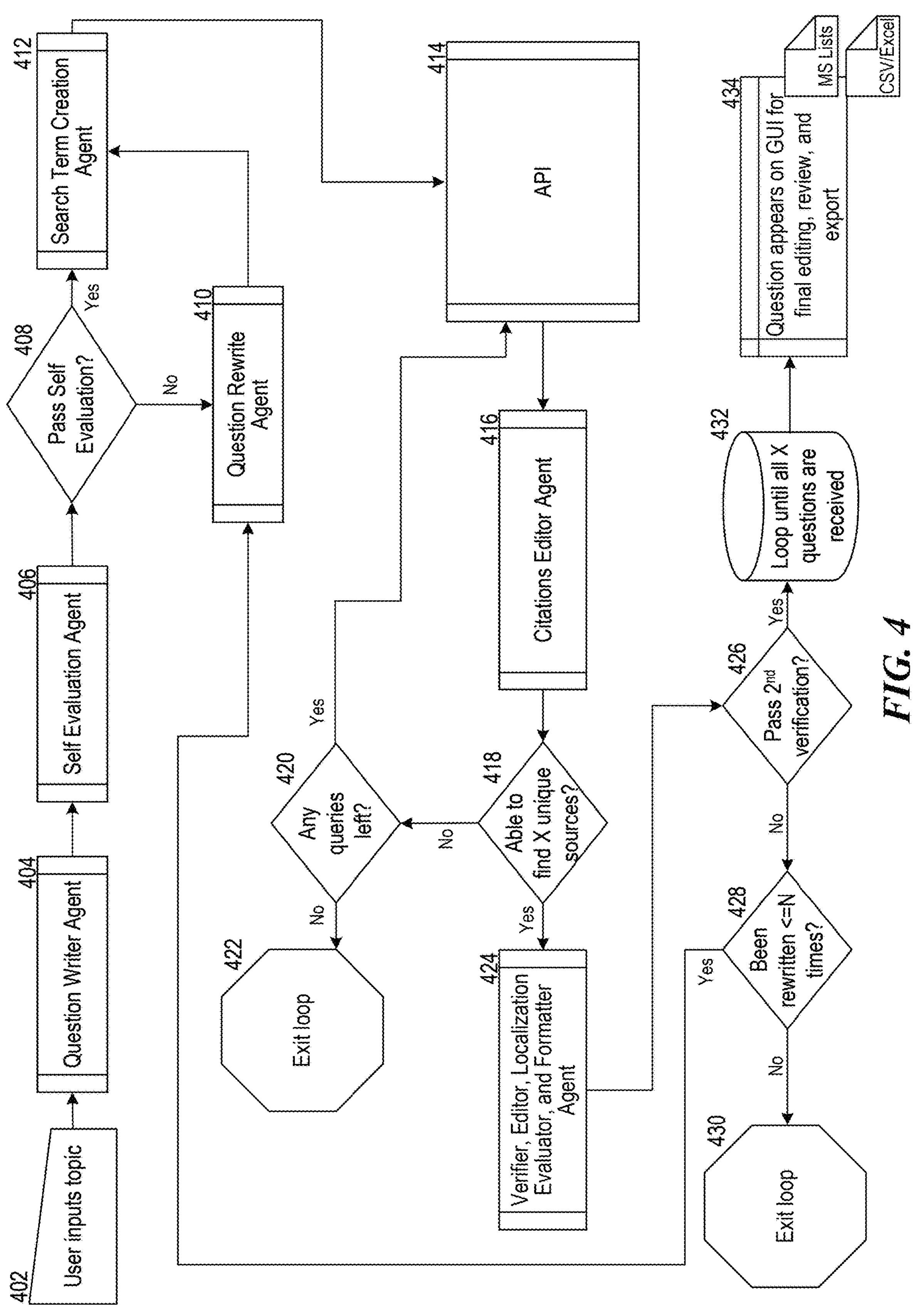
FIG. 4 is a flowchart illustrating an example method of generating questions and answers for a trivia game.

FIG. 4 is a flowchart illustrating an example method 400 of generating questions and answers for a trivia game. In some embodiments, the method 400 is performed by components of the example computer system 1100 illustrated and described in more detail with reference to FIG. 11. Embodiments can include different and/or additional operations or can perform the operations in different orders.

At operation 402, the method 400 begins with the user inputting a request (e.g., a topic request such as "Seinfeld," a request with parameters such as "10 questions on Seinfeld") or multiple requests (e.g., "10 science questions about dogs in multiple choice format, and 30 entertainment questions about cats in true or false format") into the content receiving module 102. Each request includes a topic, category of question (e.g., entertainment, science and nature), difficulty, number of questions to generate, format of question, and/or region/location-specific parameters. In some embodiments, the method 400 includes performing initial validation checks to ensure that the request satisfies one or more predetermined model-driven conditions using one of the validation models 106*a* through 106*n*, such as the predetermined model-driven conditions discussed with reference to FIG. 1 and FIG. 2. For instance, the method 400 filters out inappropriate or restricted topics in the user input based on predefined criteria discussed with reference to the topic check in FIG. 1.

Generating questions and answers for a trivia game using the received request is performed by one or more agents, which, in some embodiments, are different specialized models trained for specific tasks within method 400 (e.g., validation models 106*a* through 106*n*). The agents are autonomous software components or modules that operate independently to execute specific tasks or functions within a system (e.g., validation framework 300). For example, one agent specializes in generating initial questions based on the user-inputted request, while another agent specializes in evaluating and refining these questions for clarity and relevance. In some embodiments, the same agent is used for multiple tasks.

In some embodiments, one or more of the agents are implemented as distinct neural network architectures (e.g., transformer-based model, convolutional neural network ("CNN"), recurrent neural network ("RNN")). In some embodiments, one or more of the agents are rule-based systems using predefined rules and templates to guide the question generation and evaluation processes. The rule-based agents use a set of heuristics (e.g., a collection of rules or guidelines) to generate questions that adhere to specific formats and styles. In some embodiments, the agents are integrated with external knowledge bases or databases to enhance the accuracy and relevance of the questions. For example, the question generation agent accesses a knowledge graph to retrieve up-to-date information on the topic to ensure that the questions are factually correct (e.g., accuracy check in FIG. 1). The self-evaluation agent cross-references the generated questions with the knowledge base to verify the accuracy of the questions generated by the question generation agent.

The agents are, in some embodiments, deployed in a distributed computing environment, where each agent operates on a separate node within a network. The distributed architecture allows for parallel processing of tasks, improving the efficiency and scalability of the system. The question generation agent generates multiple sets of questions simultaneously, while the evaluation agent processes generated questions in parallel. Additionally, in some embodiments, an agent that manages interactions between the various specialized agents. The management agent coordinates the workflow (e.g., method 400) by, for example, ensuring each task is executed in the correct sequence. In some embodiments, the management agent monitors the capacity and computational load of each agent to dynamically adjust workloads to balance the computational load and prevent bottlenecks. Furthermore, each node operates independently, so if one node fails, the management agent reassigns tasks to other nodes to reduce instances of disruption.

At operation 404, an agent such as a question writer agent generates an initial set of questions based on the user-inputted request. In some embodiments, the question writer agent is an LLM. For instance, a request such as "Seinfeld" is combined with a predefined system prompt such as "generate X number of questions for the topic (topic)" and included pre-loaded query context (e.g., the pre-loaded query context in FIG. 1). The question writer agent generates one or more types of questions and corresponding answer(s), such as multiple-choice questions, open-ended questions, and/or true/false questions based on the pre-loaded query context.

In multiple-choice formats, the pre-loaded query context includes instructions (e.g., commands) to generate both correct and incorrect answers for each question. For open ended questions, the pre-loaded query context instructs the LLM to provide a prompt that has a descriptive answer (e.g., an answer above a certain number of words). For example, an open-ended question is "Describe the relationship between Jerry and Newman." The pre-loaded query context for true/false questions, on the other hand, instructs the LLM to generate questions with a binary answer (e.g., "True" or "False"). For example, a true/false question is "True or False: George Costanza is Jerry's best friend." Furthermore, the pre-loaded query context includes generating questions of one or more categories (e.g., entertainment, geography, history) for a single request. For example, a request such as "Seinfeld" is combined with pre-loaded query context to generate questions across multiple categories such as entertainment, geography, history, and so forth.

In some embodiments, the generated questions are output in a JSON array format. For example, the output of the question writer agent to a topic "Seinfeld" is: [{"question": "Which character is known for the catchphrase 'Yada, yada, yada'?", "correct answer": "Elaine Benes", "incorrect answer 1": "George Costanza", "incorrect answer 2": "Kramer", "incorrect answer 3": "Jerry Seinfeld" }]. The question writer agent includes metadata in the output (e.g., questions and corresponding answer(s)), such as timestamps, question difficulty levels, and/or topic tags. The metadata provides additional context and enables the filtering and sorting of the output. In some embodiments, the question writer agent tracks/logs the number of tokens processed by the question writer agent during question generation, on a per-question basis and/or for the entire set to determine computational resource usage.

At operation 406, the generated questions and corresponding answers are evaluated by an agent such as a self-evaluation agent. The self-evaluation agent validates the questions against predetermined model-driven conditions using one or more validation models 106*a* through 106*n*. The self-evaluation agent generates an indicator for each question indicating whether the question satisfies the predetermined model-driven conditions. The indicator, in some embodiments, is a binary value (e.g., pass/fail), categorical value (e.g., pass, replace, rewrite), or other score that reflects one or more dimensions evaluated by the validation models 106*a* through 106*n*.

For example, the self-evaluation agent determines an indicator such as "pass," "rewrite," and/or "replace," to provide a directive for the subsequent operations. The "pass" indicator signifies that the question has met all (or a predefined amount) of the predetermined model-driven conditions and is ready for inclusion in the trivia game. The "rewrite" indicator suggests that the self-evaluation agent has identified one or more unsatisfied model-driven conditions (e.g., clarity issues, ambiguity issues) in the question and/or answer(s). The "replace" indicator indicates that the self-evaluation agent has identified one or more unsatisfied predetermined model-driven conditions that triggers the method 400 discard the generated question and replace with a new question (e.g., factual inaccuracy). In some embodiments, the self-evaluation agent outputs an explanation for each question that does not pass that indicates why the question failed one or more of the validation models 106*a* through 106*n*. For example, the explanation indicates that a question failed due to ambiguity, factual inaccuracy, and/or lack of relevance to the topic. In some embodiments, the questions that failed due to factual inaccuracy are assigned a "replace" indicator, whereas questions that failed due to ambiguity are assigned a "rewrite" indicator.

For instance, the self-evaluation agent employs machine learning models trained on large datasets of trivia questions to predict the likelihood of a question passing or failing the predetermined model-driven conditions. The models use a variety of features to make their predictions, including question length, complexity, keyword relevance, grammatical correctness, factual accuracy, and/or ambiguity detection. Question length is measured by the number of words or characters. Shorter questions, for example, those with a word count below a predefined threshold (e.g., fewer than 10 words), are flagged for lack of detail, as they may not provide enough context or information. Conversely, longer questions, those exceeding a certain threshold (e.g., more than 30 words), are flagged for verbosity, as the questions and/or answers are overly complex or cumbersome for users to read and understand quickly.

The self-evaluation further assesses complexity using readability metrics such as the Flesch-Kincaid readability score, which evaluates the ease of understanding based on sentence length and word syllable count. Questions with high readability scores, indicating they are difficult to understand, are flagged for being overly complex. The self-evaluation determines keyword relevance by analyzing the presence and frequency of topic-specific keywords within the question and/or answers. The self-evaluation agent uses a predefined list of relevant keywords for each topic and checks if these keywords appear in the question. Questions/answers lacking the keywords or having a frequency below a certain threshold are flagged for being off-topic, ensuring that the questions are pertinent to the specified subject matter.

Grammatical correctness is evaluated by scanning the text for grammatical errors such as subject-verb agreement, incorrect verb tenses, and misplaced modifiers. Further, the self-evaluation agent partitions the generated question/answer into the content's constituent parts (e.g., nouns, verbs, adjectives) and checking the syntactic relationships between them. For instance, a grammar checker flags a sentence such as "Elaine dance at the party" for incorrect subject-verb agreement, and identifies a misplaced modifier in a sentence such as "Eating a big salad, George's satisfaction was evident." Factual accuracy is checked by cross-referencing the content of the question with verified information from a knowledge base or database. The self-evaluation agent uses entity recognition and fact-checking algorithms to ensure that the information presented in the question is correct. Questions with discrepancies or inaccuracies are flagged for replacement, as they could mislead or confuse users.

The self-evaluation agent detects ambiguity by identifying terms or phrases within the question that could lead to multiple interpretations. For example, the self-evaluation agent tokenizes the question/answers to identify terms and phrases, and uses vector representations such as word embeddings to measure the similarity (e.g., using cosine similarity) between terms and detect potential ambiguities. For instance, in the question "What did George do at the diner?" the verb "do" is vague and could refer to many actions. The self-evaluation agent detects the ambiguity by analyzing the vector representation of "do" and comparing the vector representation with vectors of other potential actions. If the similarity scores indicate that "do" could be interpreted in multiple ways (e.g., similar or close in distance to multiple other vectors), the agent flags the question for rewrite.

At operation 408, the method 400 performs a check to determine if the self-evaluation agent's generated indicator indicates that the generated questions have satisfied the predetermined model-driven conditions. For example, the check determines if the indicator indicates a pass or fail (e.g., "rewrite," "replace," "fail"). For questions and corresponding answers that pass the self-evaluation (e.g., questions that satisfy the predetermined model-driven conditions), the method 400 proceeds to operation 412. Otherwise, for questions and corresponding answers that were rejected (e.g., questions that fail to satisfy the predetermined model-driven conditions), the method 400 proceeds to operation 410.

At operation 410, the question rewrite agent revises the questions and/or corresponding answers in accordance with the self-evaluation agent's generated explanation of why the particular questions failed one or more of the validation models 106*a* through 106*n*. The question rewrite agent modifies the questions by rephrasing the questions, supplementing the question with additional context, removes portions of the question, and/or replaces portions of the question. The input to the question rewrite agent is the request, the rejected question(s), and/or the generated explanation of the self-evaluation agent. For examples, for questions categorized as "replace" by the self-evaluation agent are fully rewritten, whereas questions categorized as "rewrite" are modified in accordance with the explanation.

Based on the generated explanation, the question rewrite agent performs different types of modifications. For example, the question rewrite agent uses sequence-to-sequence modeling to generate a syntactically and semantically correct version of the question. Sequence-to-sequence models ingest an input sequence (the original question) and produce an output sequence (the rephrased question). The encoder processes the input sequence and creates a context vector, which the decoder then uses to generate the output sequence. For example, if the original question was "What did George do at the diner?" and the explanation indicated that "do" is too vague, the question rewrite agent rephrases the question to "What food did George order at the diner?" In some embodiments, the question rewrite agent replaces incorrect parts of the question identified by the self evaluation agent. For example, if a question incorrectly refers to a character or event, such as "What did Jerry do at the coffee shop?" when the question should refer to George, the agent replaces "Jerry" with "What did George do at the coffee shop?"

In some embodiments, the input to the question rewrite agent includes one or more questions and corresponding answers that satisfied the predetermined model-driven conditions to prevent the question rewrite agent from outputting similar questions. The question rewrite agent, in some embodiments, uses cosine similarity measures to compare the vector representations of the generated questions with those of the input questions. If the similarity score exceeds a certain threshold, indicating that the generated question is too similar to an existing one, the question rewrite agent discards the question and generate a new candidate.

At operation 412, once the questions and corresponding answers are rewritten/replaced and pass the self-evaluation, an agent such as a search term creation agent generates search terms related to the rewritten/replaced questions and the approved questions. In some embodiments, all (or a predefined amount) of the rewritten/replaced and approved questions along with their corresponding answers are collected into a single batch and sent to the search term creation agent. In other embodiments, each question and the question's corresponding answer are prepared as individual queries and sent separately to the search term creation agent.

The pre-loaded query context includes commands/instructions for the search term creation agent to output one or more tokens (e.g., words, phrases) used to search for a citation source for the question(s). The search term creation model, which could be a transformer-based model (e.g., GPT) or a simpler rule-based system, generates a list of potential search terms for each question-answer pair by identifying phrases and entities in the question and answer and generating synonyms and related terms using a thesaurus or pre-trained language model. The search term creation agent uses the similarity (e.g., cosine similarity, Euclidean distance) between the search terms and the vector representations of the tokenized questions/answers to ensure the search terms are relevant to the context of the questions and answers. For example, search terms with a smaller distance (higher similarity) are considered more relevant and are prioritized.

The search terms are used to find supporting information and citations in operation 414. At operation 414, the search terms are sent to an API (e.g., Brave Search API), which retrieves one or more citations (e.g., snippets) from one or more sources. The search term creation agent sends the generated search terms to the API endpoint, which processes the request and queries a database or external sources to find relevant citations. The API uses the search terms to match against indexed content, retrieving citations of information that are contextually relevant to the search terms. The citations, such as snippets, are pieces of information that support the content of the questions and answers. The API returns the citations to the search term creation agent, which associates the citations with the corresponding questions and answers.

At operation 416, an agent such as a citations editor agent receives the questions and answers along with their associated citations and verifies that each question-answer pair is supported by the required number of unique citations (e.g., by at least three unique citations retrieved by operation 414). The citations editor agent obtains one or more questions and corresponding answers evaluated by operation 414 and outputs an indicator indicating the source(s) supporting the questions and corresponding answer. If the citations editor agent identifies that a question-answer pair is supported by the required number of citations, the citations editor agent outputs an indicator confirming the validation. In some embodiments, if the citations editor agent fails to identify the supporting sources (e.g., the citations editor agent only identifies two sources, but three are required), the citations editor agent outputs a corresponding explanation of the indicator. This explanation details why the validation failed, such as the lack of sufficient unique citations.

In some embodiments, the input into the citations editor agent is annotated to indicate, to the citations editor agent, portions of the output of the API to focus on. For example, when the API retrieves citations, the citations editor agent or another preprocessing agent analyzes the content to identify the most relevant sections using NLP techniques such as named entity recognition ("NER") to identify entities, keyword extraction to tag the main topic/themes, or semantic similarity measures. The tags are markers (e.g., Hypertext Markup Language ("HTML") tags, JSON keys) that indicate the start and end of relevant sections. The annotations reduce token usage by enabling the citations editor agent to process the information without expending unnecessary computational resources on irrelevant data.

At operation 418, if the citations editor agent is able to find support, such as three unique sources, the method continues to operation 424. Otherwise, the method 400 proceeds to operation 420. At operation 420, the method 400 checks if there are any queries left that. If there are, the method proceeds back to operation 414 to send the next search term to query the API for results to attempt to find additional citations. If there are no more queries left to process, the method exits the loop at operation 422. The exit point indicates that all (or a predefined amount) of the possible search terms have been queried and the citations editor agent has either found the necessary support or failed to find sufficient citations with the available search terms. Exiting the loop at operation 422 results in the pair being flagged for further review, revision, or rejection.

At operation 424, the questions are subject to a review by an agent such as an assessment agent. The predefined query context of the assessment agent includes, for example, a verification by one or more validation models 106*a*-106*n* of the sources retrieved by the API and/or the question and corresponding answers. For example, the predefined query context instructs the assessment agent to evaluate the content of the question and corresponding answers under a localization text and output an indicator indicating a relevance of the question and corresponding answer to a language and/or market (e.g., "1" corresponds to not relevant to the language/market, whereas "10" corresponds to highly relevant to the language/market).

In some embodiments, the assessment agent tags the question and corresponding answers with one or more metadata tags. For example, the metadata tags are a predefined list of topics used to categorize the generated questions and corresponding answers (e.g., "Religion," "Cuisine," "Video Games"). These tags are stored in a structured format, such as JSON or Extensible Markup Language ("XML"), alongside the content for retrieval in future queries. The assessment agent formats each question/answer pair in a predefined format (e.g., JSON) that indicates the question, answers, supporting sources, question format, and/or metadata tags.

At operation 426, if the questions satisfy the predetermined model-driven conditions of the validation models used in operation 424, the method 400 proceeds to operation 432. If not, the method 400 checks the rewrite count at operation 428. The method 400 maintains a counter that tracks the number of times each question has been revised. If the counter is below the threshold (e.g., three), the content is sent back to operation 410 for further revision, where the content is subject to another round of rewriting and validation. If the counter exceeds the threshold, the method 400, at operation 430, prevents the questions from proceeding to operation 410, and flags the question for review or rejection.

At operation 432, the loop continues until a predefined number (e.g., all questions, such as 36 for a trivia set) questions are assessed via the assessment agent (e.g., to ensure that a complete set of trivia questions is generated). A counter tracks the number of questions processed. Each time a question passes the validation checks, the counter increments. If a question fails validation, the question is sent back for revision, and the loop continues with the next question. The loop only terminates when the counter reaches the predefined number, indicating that the complete set of questions/answers has been successfully generated and validated.

At operation 434, the questions and corresponding answers appear on a graphical user interface ("GUI") (e.g., front-end interface 302), where the questions are ready for use in a game such as a trivia game. In some embodiments, the questions appearing on the GUI in operation 434 are evaluated by one or more human agents prior to inputting the questions and corresponding answers into the trivia game.

Figure 5:
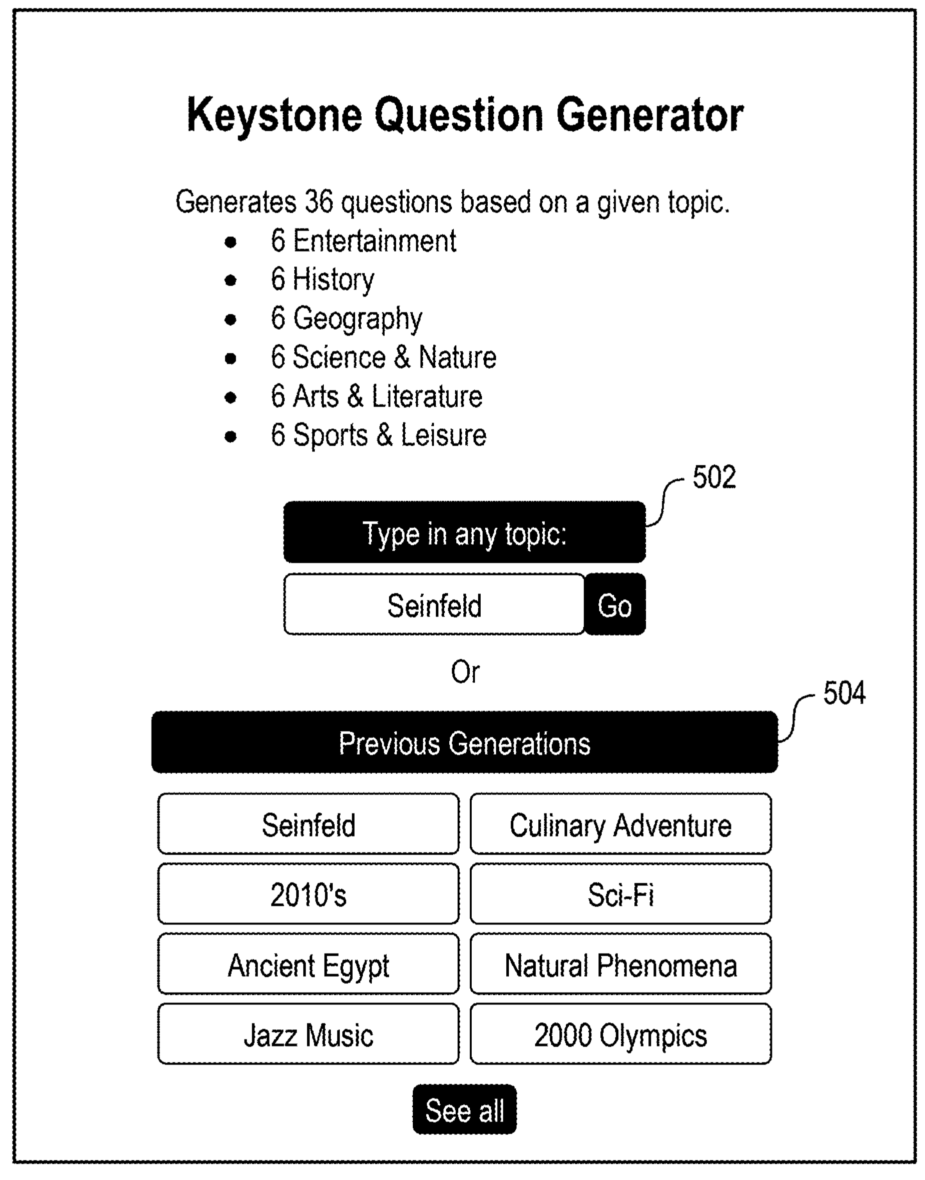
FIG. 5 is one embodiment of a front-end interface as applied to generating questions and answers for a trivia game.

FIG. 5 is one embodiment of a front-end interface 500 as applied to generating questions and answers for a trivia game. The front-end interface 500 includes topic indicator 502 and previous generation indicator 504. The front-end interface 500 is implemented using components of the example computer system 1100 illustrated and described in more detail with reference to FIG. 11. Embodiments of the front-end interface 500 can include different and/or additional components or can be connected in different ways.

The topic indicator 502 enables users to input or select a topic for which they want to generate trivia questions. For example, the topic indicator 502 includes a text input field, a dropdown menu, or other selection mechanisms. For example, a dropdown menu includes a list of predefined topics to enable users to select from popular or commonly requested topics without typing the topics out fully. In some embodiments, other selection mechanisms include voice input using speech recognition technology, which converts spoken words into text and matches them against the predefined list of topics or generates new topics based on the recognized speech. In some embodiments, the topic indicator 502 enables users to choose multiple topics simultaneously (e.g., using checkboxes or a multi-select dropdown menu) to generate trivia questions that span several topics.

The previous generation indicator 504 provides information about the last set of questions generated, including details such as the number of questions, the topic, and/or the time of generation to help users keep track of their previous activities and avoid generating duplicate questions. For instance, if a user generated 20 questions on the topic "Seinfeld" previously (e.g., in the same session or in a previous session), the previous generation indicator 504 indicates the topic, enabling the user to decide whether to generate more questions on the same topic or choose a different one. The indicator, in some embodiments, includes additional details such as the difficulty level of the questions, the format (e.g., multiple-choice, true/false), and/or any metadata tags.

Figure 6:
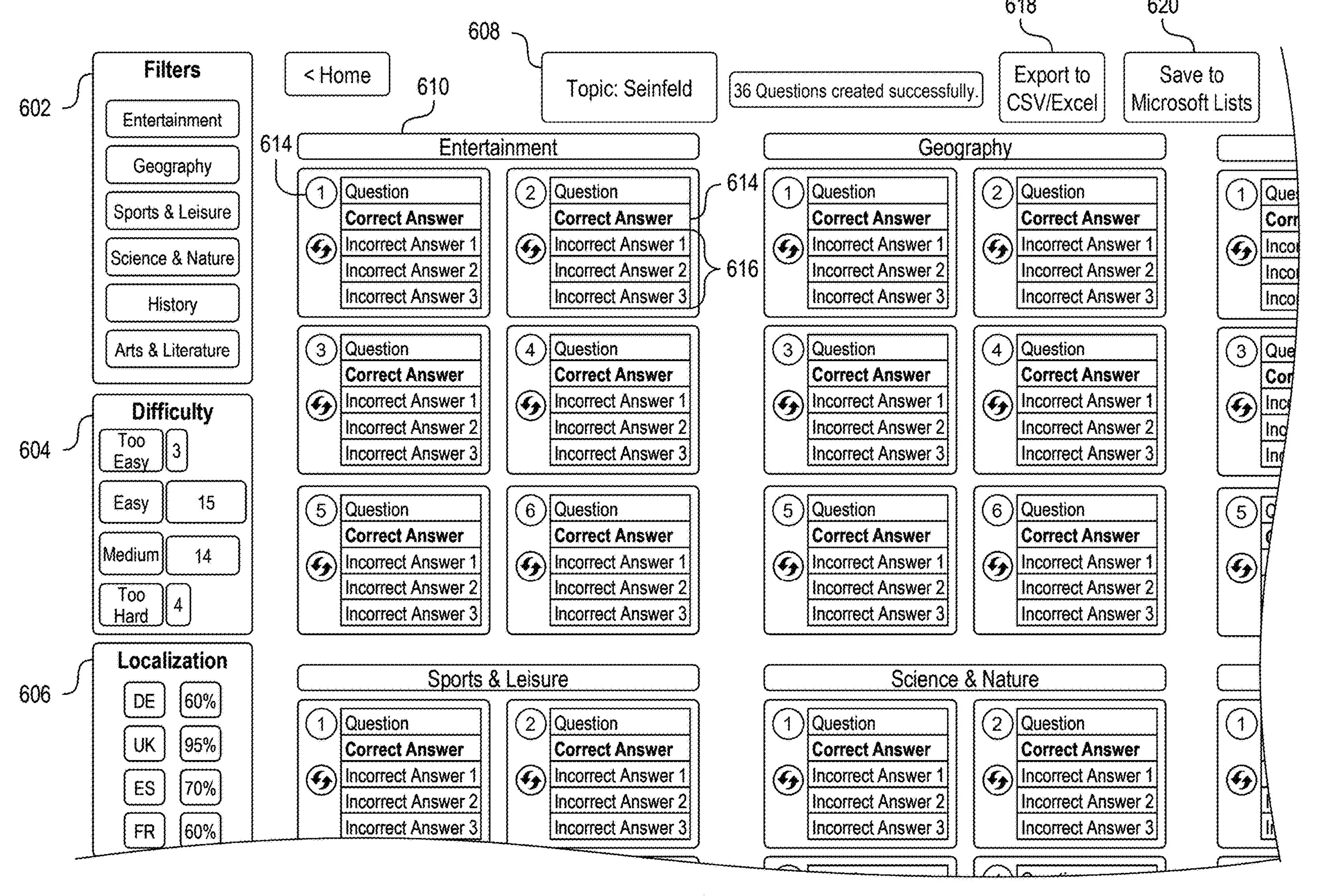
FIG. 6 is one embodiment of a front-end interface displaying the generated questions and answers for the trivia game.

FIG. 6 is one embodiment of a front-end interface 600 displaying the generated questions and answers for the trivia game. The front-end interface 600 includes filters 602, difficulties 604, localizations 606, topic 608, dimension 610, question 612, correct answer 614, incorrect answers 616, export indicator 618, and storage indicator 620. The front-end interface 600 is implemented using components of the example computer system 1100 illustrated and described in more detail with reference to FIG. 11. Embodiments of the front-end interface 600 can include different and/or additional components or can be connected in different ways.

The filters 602 allow users to refine the displayed questions based on specific dimensions 610 (e.g., categories such as "Entertainment," "Geography") helping users find and manage the questions. The difficulties 604 component enables users to categorize questions by difficulty level, such as "easy," "medium," and "hard," or custom levels defined by the user to ensure that the questions are appropriate for the intended audience. The localizations 606 component allows users to generate and display questions in different languages or regional variations, by selecting the desired language or region from a dropdown menu or other selection mechanism.

The topic 608 component displays the topic for which the questions have been generated. The dimension 610 component provides additional context or categorization for the questions, such as subtopics or themes, to help organize the questions more effectively. The question 612 component displays the generated trivia questions. The correct answer 614 component displays the correct answer for each trivia question, and likewise, the incorrect answers 616 component displays the incorrect answers for each trivia question. The export indicator 618 allows users to export the generated questions and answers in various formats, such as JSON, CSV, or PDF to share or integrate the questions into different systems or applications. The storage indicator 620 enables the storage of the generated questions and answers.

Figure 7:
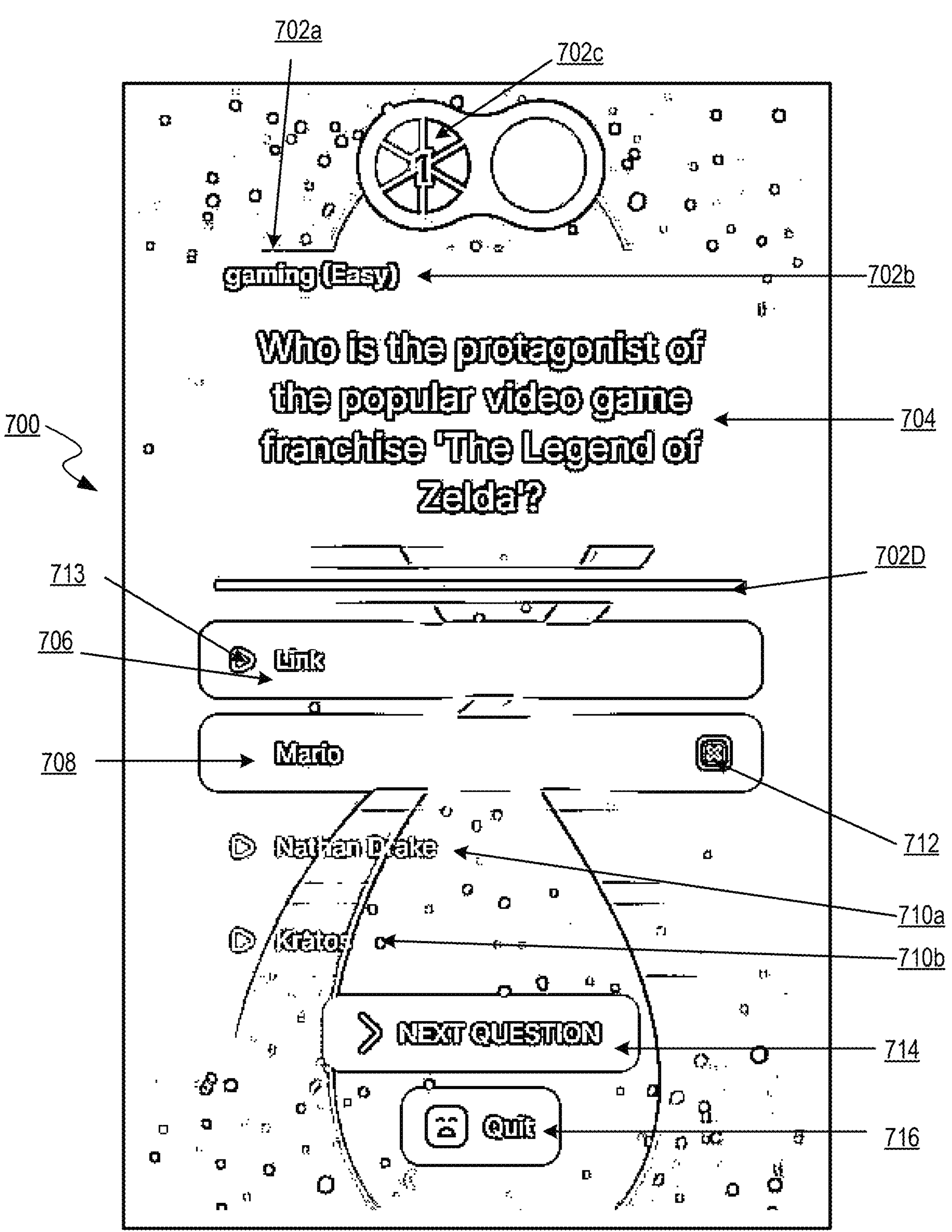
FIG. 7 is a screenshot of one embodiment of a front-end interface as applied to a trivia game.

FIG. 7 is a screenshot of one embodiment of the front-end interface 700 as applied to a trivia game. In some embodiments, the front-end interface 700 includes headers 702. In some embodiments, the headers 702 include a variety of information helpful to the user, such as the user-requested topic 702*a* or the difficulty level of the trivia game 702*b*. Further headers include, but are not limited to: 1) a timer 702*d* that displays the remaining time for answering each question, and 2) a progress indicator 702*c* graphically represents the user's advancement through the trivia game, providing a tangible sense of achievement and urgency.

A question 704 is displayed on the front-end interface 700. In some embodiments, below each question 704, a set of answer options (706, 708, 710*a*, 710*b*) is presented, allowing users to select their preferred answer by clicking or tapping the corresponding option. Additionally, in some embodiments, one or more supplementary features like a leaderboard, social sharing options, or in-game chat functionality are integrated into the interface, depending on the game's design. Once the user submits their answer, the incorrect answer 708 is highlighted with a second visual icon 712, and similarly, the correct answer 706 is highlighted using a first visual icon 713. In some embodiments, selected answers 706 are visually highlighted for clarity. In some embodiments, there is a progression button 714 that enables users to advance to the next question, ensuring a fluid and uninterrupted gameplay experience. In some embodiments, there is a quitting button 716, configured so that the user can leave the gaming experience at any time.

Synthetic Users

A synthetic user is where the generative AI takes on a role and engages in a back-and-forth interaction with the user (e.g., a chat). The model is governed by a pre-loaded query context indicating what role the main model is to take on. In some embodiments, input, and output to the synthetic user are treated in a similar fashion as described above with respect to validator models.

In some embodiments, the generative AI model that is configured as a synthetic user is communicatively coupled with a graphic user interface to enable a user to interact. The output of the synthetic user is employed to govern the graphic user interface. Embodiments of the graphic user interface directly display the synthetic user output, use the output as commands to a game platform, and/or cause animations to play.

Figure 8:
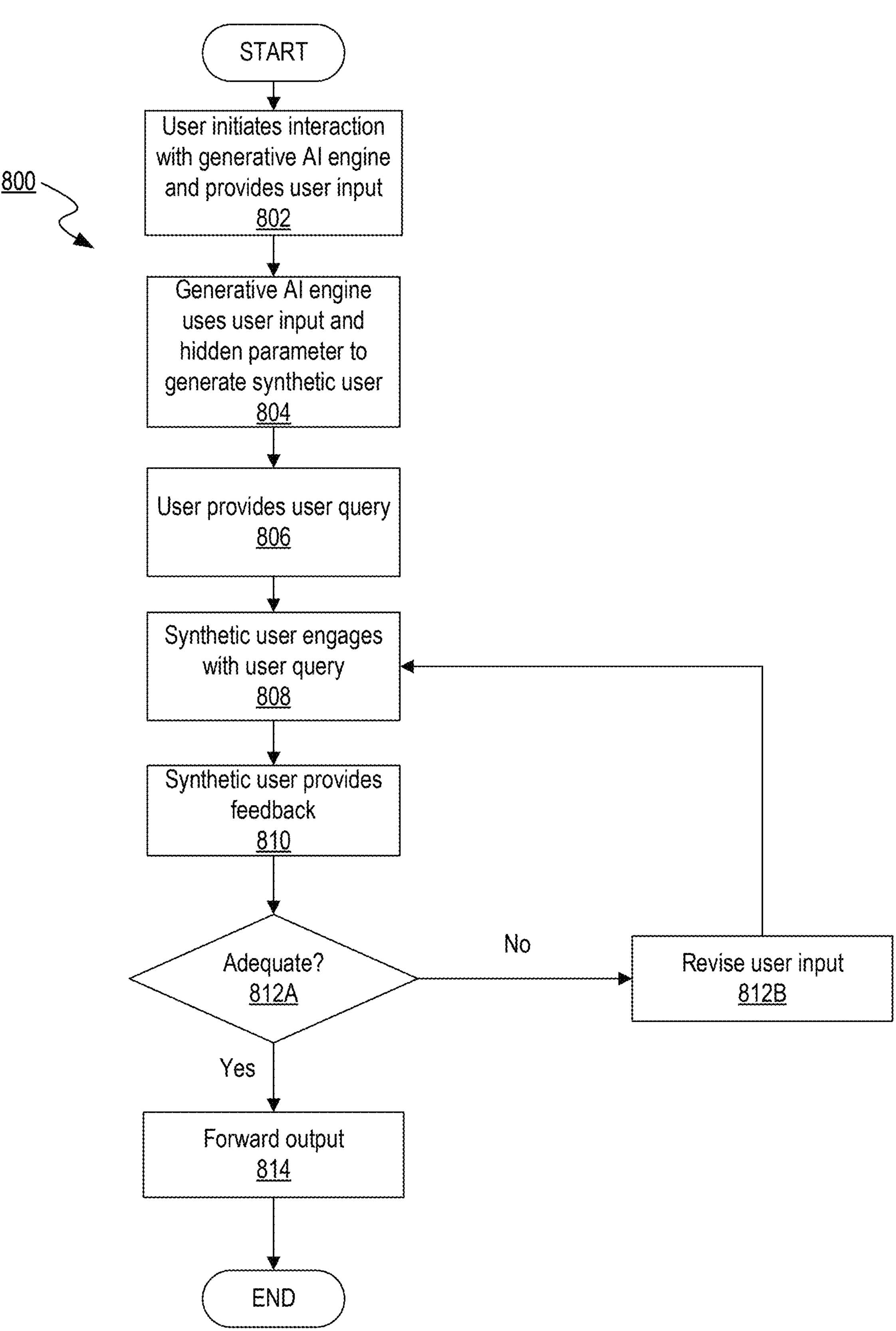
FIG. 8 is a flowchart illustrating an example method of implementing a synthetic user using the validation process in FIG. 1.

FIG. 8 is a flowchart illustrating an example method 800 of implementing a synthetic user using the validation process in FIG. 1.

The process initiates with user initiating interaction with a generative AI engine by providing user input 802. The input serves as a directive, guiding the generative AI engine in the engine's synthetic user creation process. For example, some user input 802 examples can be "Ouija board," "Peppa Pig," "Optimus Prime," and so on. In some embodiments, in the context of a virtual Ouija board session, the synthetic user is the Ouija board, obviating a need for user input 802.

The generative AI engine, in turn, interprets and processes the input, and generates parameters of a synthetic user 804. In some embodiments, the parameter is hidden from the user. The hidden parameter, while not explicitly specified in user input, enables the model to produce content that adheres to the specific characteristics dictated by the designated virtual character role. In some embodiments, the hidden parameter functions in the same way as a pre-defined query context, further detailed in FIG. 1. Both the pre-defined query context and the hidden parameter guide the generated responses based on predetermined model-driven conditions.

For example, a user input is received 802 from a participant belonging to a "Carefree Competitors" market segment. The hidden parameter, not able to be modified by the user, characterizes the "Carefree Competitors" market segment by individuals between the ages of four through twelve who share an affinity for straightforward, engaging games with brisk gameplay. The hidden parameter further includes that, much like the classics including Jenga, Twister, or Guess Who, the group prioritizes activities that are lively, stimulating, and require minimal contemplation for the next move. For example, hidden parameter prefers gaming sessions that typically span less than an hour, and places emphasis on the enjoyment derived from gameplay rather than the ultimate outcome. In this case, synthetic user 804 would encompass the characteristics given by the hidden parameter and respond in a way that aligns with the characteristics given by the hidden parameter.

In another example, where the synthetic user is a Ouija board and is functioning as the embodiment of a deceased individual, the hidden parameter instructs the synthetic user to respond to inquiries with an air of ambiguity and mystique, utilizing a restricted vocabulary of letters and numbers, and adhering strictly to concise, one-to-two-word responses. For example, in the context of a Ouija board game, where a user input is "I summon the spirit of Leonardo da Vinci. Please share your knowledge with us," the generative AI engine generates responses in a manner consistent with the specific attributes associated with Leonardo da Vinci, who is the designated virtual character role. The specific attributes associated with Leonardo da Vinci (e.g., expert in painting, lived in the Renaissance era, Italian) will be defined in the hidden parameter.

In some embodiments, the parameters encompass attributes related to emotional states. These emotional nuances, ranging from serenity to apprehension, are dynamically inserted into the responses. In some embodiments, the parameters encompass predefined personality traits, allowing the generative AI engine to craft responses in accordance with the character traits embedded within the designated virtual character role. Predefined personality traits ensure that the responses align with the character's disposition, whether the disposition be assertive, compassionate, mysterious, or other defined attributes, adding depth and consistency to the interaction.

In some embodiments, the parameters encompass linguistic nuances, permitting the generative AI engine to seamlessly adopt specific language styles, dialects, or colloquialisms associated with the designated virtual character role. In some embodiments, the parameters encompass contextual adaptability. Contextual adaptability enables the generative AI engine to dynamically adjust the generated feedback based on ongoing conversation or specific situational cues. The model attunes itself to the evolving context, ensuring that the responses remain relevant and coherent within the given interaction. Moreover, in some embodiments, the parameters incorporate specific cultural or demographic attributes, aligning the generated feedback with the preferences and expectations of a designated target audience.

In some embodiments, after processing the user input to generate the synthetic user 804, the generative AI engine is equipped to output an assessment of the classification with or without further user input. The assessment serves as a valuable validation mechanism, providing users with insights into the engine's generation of the synthetic user 804. For instance, the engine indicates a high confidence level in the classification, signifying that the attributes assigned to the synthetic user closely match the provided information. Alternatively, the engine identifies potential areas of uncertainty or ambiguity in the classification, prompting users to review and, if necessary, refine the input for a more precise representation. The dynamic feedback loop ensures that the synthetic user's classification aligns as closely as possible with the user's intended profile.

Using the above example regarding the "Carefree Competitor" market segment, if the engine's classification indicates that around 78% of the "Carefree Competitor" market typically engage in games for less than an hour, and the figure contrasts with the user's expectation, the user is able to revise the synthetic user's classification by varying the characteristics in the user input, ensuring the synthetic user accurately mirrors their specific circumstances and preferences.

Subsequently, the user provides a user query 806. In some embodiments, a user query is in the form of a question. In some embodiments, the query is a visual or auditory input. For example, a game developer would submit a rendering of the main character for the synthetic user to evaluate, or a sample of the music to be used in the game to ensure that the generated content is suitable for their target audience.

Next, in operation 808, the synthetic user engages with the user query provided in operation 806 and provides feedback 810. In some embodiments, when a user initiates interaction by providing a query 806, the generative AI engine processes the input through a series of specialized models that encompass linguistic and behavioral characteristics specific to the synthetic user and ensure that the feedback aligns with the synthetic user's characteristics. In some embodiments, the generative AI engine leverages advanced NLP techniques to craft responses that mirror the cognitive and linguistic abilities of the synthetic user.

In some embodiments, the provided feedback is first scrutinized under a check subsystem, which includes a set of independent validation models. The set of independent validation models each checks the feedback to determine whether the feedback complies with the consensus criteria. In some embodiments, each of the set of independent validation models is equipped with the model's own unique validation capabilities, bolstering the overall assessment process. In one example, if the feedback is about a historical event that is factually incorrect, such as stating that Abraham Lincoln was not the 16th President of the United States, the check subsystem would fail the accuracy check. In another example, if the feedback incorporates a number of special characters or symbols, such as "@n$w3r," the format check would fail.

In some embodiments, the feedback received from the synthetic user 808 is validated through a decision point 812A. In some embodiments, if the user decides that the synthetic user's feedback is adequate, the method ends. In other embodiments, if the user decides that the synthetic user's feedback is inadequate, the user is enabled to revise the user query 812B. The revised content generated in operation 812B is then directed back to operation 808. Here, a new iteration of the synthetic user feedback is initiated. The revised content is subjected to the same evaluation by the synthetic user.

In operation 814, the output is forwarded. In some embodiments, the output from the validation models is communicatively connected to an animation engine. The animation engine generates an animation to be graphically displayed on the user interface based on instructions from the validation models or main model. In some embodiments, the animation engine is not an AI engine itself, but rather a scripted animator (generates animations based on predefined scripts but based on instructions from the output of AI models).

Figure 9:
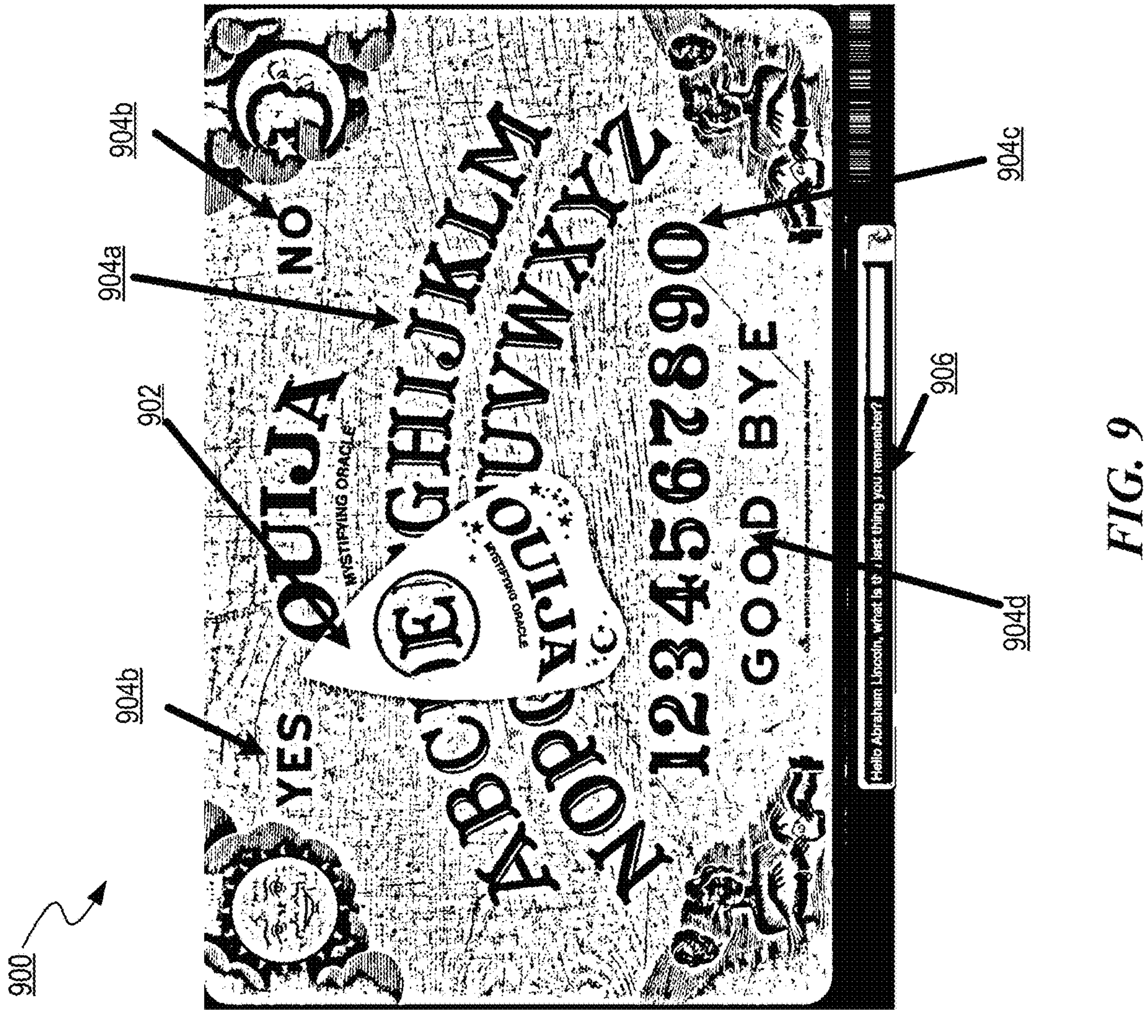
FIG. 9 is a screenshot of one embodiment of a front-end interface as applied to a Ouija board game.

FIG. 9 is a screenshot of one embodiment of the front-end interface of a synthetic user as applied to a Ouija board game.

The central interactive element within the disclosed Ouija board 900 is the planchette 902. The planchette 902 serves as the conduit for user interaction with the supernatural realm. In some embodiments, users employ the planchette to select letters, numbers, or other indicators, facilitating communication with the otherworldly entities.

In some embodiments, central to the Ouija board 900 is the depiction of the Ouija board itself, including, but not limited to, the customary arrangement of letters 904*a*, "Yes" and "No" indicators 904*b*, numbers 904*c*, and the "Good Bye" indicator 904*d*. In some embodiments, as users engage with the Ouija board 900, subtle visual effects, such as faint glowing or shadowy apparitions, accompany the movement of the planchette. In some embodiments, carefully curated auditory cues are included, like whispers or ethereal sounds, further heightening the immersive experience, and adding a sensory dimension to the gameplay. To provide users with a sense of continuity and progress within the mystical communication process, a visual indicator, is represented by a message bar 906 so that the user inputs the message they want the board to answer.

Within the disclosed Ouija board 900, the integration of a synthetic user adds a layer of sophistication to the interactive experience. The synthetic user, powered by a generative AI engine, serves as an intelligent counterpart to the human participant, enabling dynamic and responsive interactions. The synthetic user's role is particularly pronounced in tandem with the planchette 902, as the planchette collaborates with the human user to facilitate communication with the supernatural realm. As the human user guides the planchette 902 across the Ouija board 900, the synthetic user complements these movements with intuitive and contextually relevant responses. Through the intricate integration of natural language processing and contextual understanding, the synthetic user generates messages that align with the thematic essence of the Ouija board game. For example, the user requests a certain question (e.g., "Abraham Lincoln, what is the last thing you remember?"), and the response generator 314 responds with an answer related to the user-requested topic (e.g., "THEATER").

In some embodiments, the messages encompass cryptic phrases, enigmatic clues, or ethereal insights, effectively heightening the immersive experience. The synthetic user's interactions are synchronized with the planchette 902 movements, creating a fluid and coherent exchange between the human user and the supernatural realm. The synthetic user's contributions extend beyond mere responses; the synthetic user also augments the visual or auditory effects associated with the planchette's 902 movements. By dynamically influencing these effects in response to user interactions, the synthetic user enhances the overall ambiance, imbuing the experience with an extra layer of mystique and intrigue.

AI System

Figure 10:
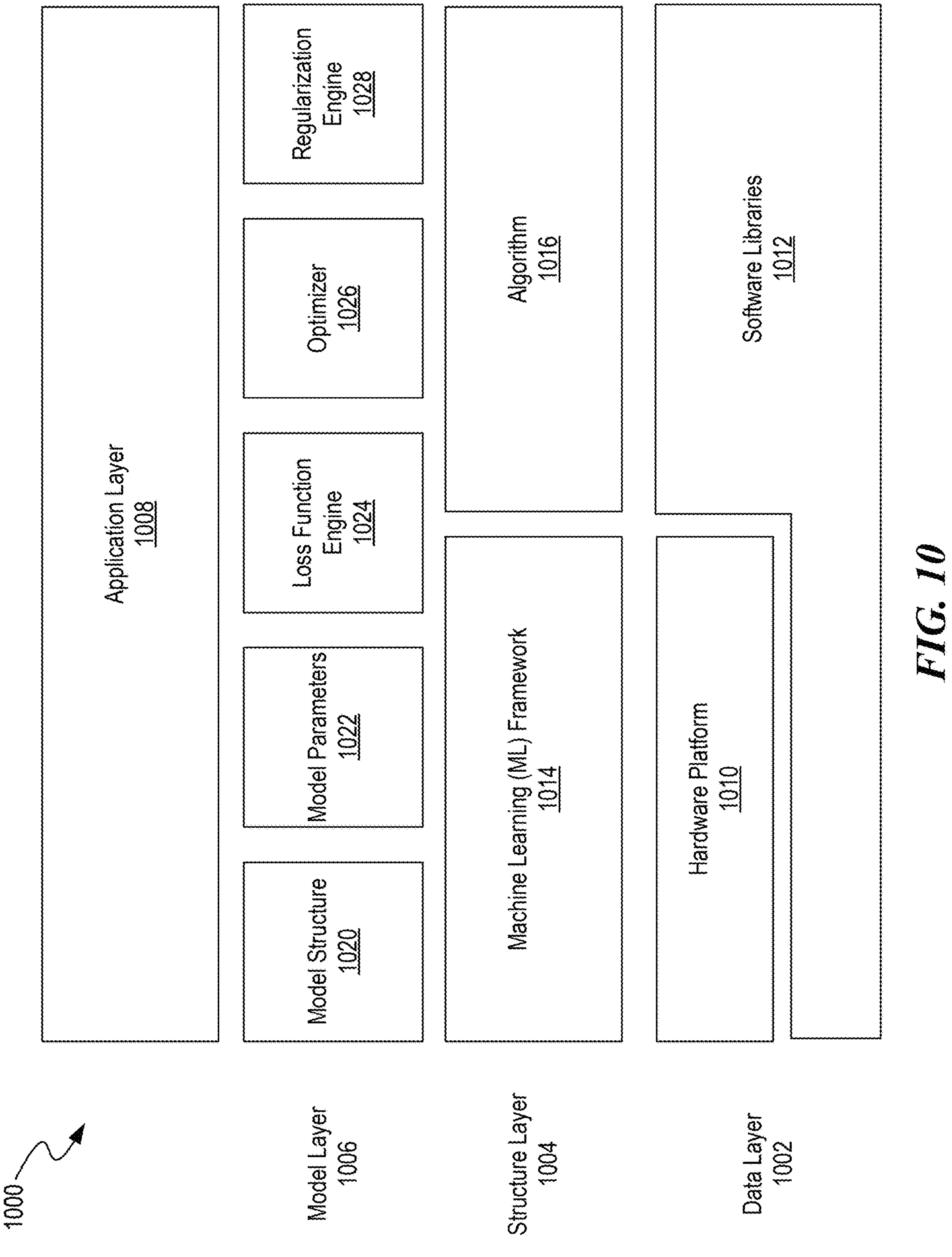
FIG. 10 is a high-level block diagram illustrating an example AI system, in accordance with one or more embodiments.

FIG. 10 is a high-level block diagram illustrating an example AI system, in accordance with one or more embodiments. The AI system 1000 is implemented using components of the example computer system 1100 illustrated and described in more detail with reference to FIG. 11. Likewise, embodiments of the AI system 1000 include different and/or additional components or be connected in different ways.

In some embodiments, as shown in FIG. 10, the AI system 1000 includes a set of layers, which conceptually organize elements within an example network topology for the AI system's architecture to implement a particular AI model 1030. Generally, an AI model 1030 is a computer-executable program implemented by the AI system 1000 that analyses data to make predictions. Information passes through each layer of the AI system 1000 to generate outputs for the AI model 1030. The layers include a data layer 1002, a structure layer 1004, a model layer 1006, and an application layer 1008. The algorithm 1016 of the structure layer 1004 and the model structure 1020 and model parameters 1022 of the model layer 1006 together form the example AI model 1030. The optimizer 1026, loss function engine 1024, and regularization engine 1028 work to refine and optimize the AI model 1030, and the data layer 1002 provides resources and support for the application of the AI model 1030 by the application layer 1008.

The data layer 1002 acts as the foundation of the AI system 1000 by preparing data for the AI model 1030. As shown, in some embodiments, the data layer 1002 includes two sub-layers: a hardware platform 1010 and one or more software libraries 1012. The hardware platform 1010 is designed to perform operations for the AI model 1030 and includes computing resources for storage, memory, logic, and networking, such as the resources described in relation to FIG. 3A and FIG. 3B. The hardware platform 1010 processes amounts of data using one or more servers. The servers can perform backend operations such as matrix calculations, parallel calculations, machine learning (ML) training, and the like. Examples of servers used by the hardware platform 1010 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1010 includes Infrastructure as a Service (IaaS) resources, which are computing resources, (e.g., servers, memory, etc.) offered by a cloud services provider. In some embodiments, the hardware platform 1010 includes computer memory for storing data about the AI model 1030, application of the AI model 1030, and training data for the AI model 1030. In some embodiments, the computer memory is a form of random-access memory (RAM), such as dynamic RAM, static RAM, and non-volatile RAM.

In some embodiments, the software libraries 1012 are thought of as suites of data and programming code, including executables, used to control the computing resources of the hardware platform 1010. In some embodiments, the programming code includes low-level primitives (e.g., fundamental language elements) that form the foundation of one or more low-level programming languages, such that servers of the hardware platform 1010 can use the low-level primitives to carry out specific operations. The low-level programming languages do not require much, if any, abstraction from a computing resource's instruction set architecture, allowing them to run quickly with a small memory footprint. Examples of software libraries 1012 that can be included in the AI system 1000 include INTEL MATH KERNEL LIBRARY, NVIDIA CUDNN, EIGEN, AND OPEN BLAS.

In some embodiments, the structure layer 1004 includes an ML framework 1014 and an algorithm 1016. The ML framework 1014 can be thought of as an interface, library, or tool that allows users to build and deploy the AI model 1080. In some embodiments, the ML framework 1014 includes an open-source library, an application programming interface (API), a gradient-boosting library, an ensemble method, and/or a deep learning toolkit that works with the layers of the AI system facilitate development of the AI model 1030. For example, the ML framework 1014 distributes processes for the application or training of the AI model 1030 across multiple resources in the hardware platform 1010. In some embodiments, the ML framework 1014 also includes a set of pre-built components that have the functionality to implement and train the AI model 1030 and allow users to use pre-built functions and classes to construct and train the AI model 1030. Thus, the ML framework 1014 can be used to facilitate data engineering, development, hyperparameter tuning, testing, and training for the AI model 1030. Examples of ML frameworks 1014 that can be used in the AI system 1000 include TENSORFLOW, PYTORCH, SCIKIT-LEARN, KERAS, CAFFE, LIGHTGBM, RANDOM FOREST, and AMAZON WEB SERVICES.

In some embodiments, the algorithm 1016 is an organized set of computer-executable operations used to generate output data from a set of input data and can be described using pseudocode. In some embodiments, the algorithm 1016 includes complex code that allows the computing resources to learn from new input data and create new/modified outputs based on what was learned. In some implementations, the algorithm 1016 builds the AI model 1030 through being trained while running computing resources of the hardware platform 1010. The training allows the algorithm 1016 to make predictions or decisions without being explicitly programmed to do so. Once trained, the algorithm 1016 runs at the computing resources as part of the AI model 1030 to make predictions or decisions, improve computing resource performance, or perform tasks. The algorithm 1016 is trained using supervised learning, unsupervised learning, semi-supervised learning, and/or reinforcement learning.

The application layer 1008 describes how the AI system 1000 is used to solve problems or perform tasks. In an example implementation, the application layer 1008 includes the response generator 314.

As an example, to train an AI model 1030 that is intended to model human language (also referred to as a language model), the data layer 1002 is a collection of text documents, referred to as a text corpus (or simply referred to as a corpus). The corpus represents a language domain (e.g., a single language), a subject domain (e.g., scientific papers), and/or encompasses another domain or domains, be they larger or smaller than a single language or subject domain. For example, a relatively large, multilingual, and non-subject-specific corpus is created by extracting text from online web pages and/or publicly available social media posts. In some embodiments, data layer 1002 is annotated with ground truth labels (e.g., each data entry in the training dataset is paired with a label), or unlabeled.

Training an AI model 1030 generally involves inputting into an AI model 1030 (e.g., an untrained ML model) data layer 1002 to be processed by the AI model 1030, processing the data layer 1002 using the AI model 1030, collecting the output generated by the AI model 1030 (e.g., based on the inputted training data), and comparing the output to a desired set of target values. If the data layer 1002 is labeled, the desired target values, in some embodiments, are, e.g., the ground truth labels of the data layer 1002. If the data layer 1002 is unlabeled, the desired target value is, in some embodiments, a reconstructed (or otherwise processed) version of the corresponding AI model 1030 input (e.g., in the case of an autoencoder), or is a measure of some target observable effect on the environment (e.g., in the case of a reinforcement learning agent). The parameters of the AI model 1030 are updated based on a difference between the generated output value and the desired target value. For example, if the value outputted by the AI model 1030 is excessively high, the parameters are adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 1030 typically is to minimize a loss function or maximize a reward function.

In some embodiments, the data layer 1002 is a subset of a larger data set. For example, a data set is split into three mutually exclusive subsets: a training set, a validation (or cross-validation) set, and a testing set. The three subsets of data, in some embodiments, are used sequentially during AI model 1030 training. For example, the training set is first used to train one or more ML models, each AI model 1030, e.g., having a particular architecture, having a particular training procedure, being describable by a set of model hyperparameters, and/or otherwise being varied from the other of the one or more ML models. The validation (or cross-validation) set, in some embodiments, is then used as input data into the trained ML models to, e.g., measure the performance of the trained ML models and/or compare performance between them. In some embodiments, where hyperparameters are used, a new set of hyperparameters is determined based on the measured performance of one or more of the trained ML models, and the first step of training (i.e., with the training set) begins again on a different ML model described by the new set of determined hyperparameters. These steps are repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) begins in some embodiments. The output generated from the testing set, in some embodiments, is compared with the corresponding desired target values to give a final assessment of the trained ML model's accuracy. Other segmentations of the larger data set and/or schemes for using the segments for training one or more ML models are possible.

Backpropagation is an algorithm for training an AI model 1030. Backpropagation is used to adjust (also referred to as update) the value of the parameters in the AI model 1030, with the goal of optimizing the objective function. For example, a defined loss function is calculated by forward propagation of an input to obtain an output of the AI model 1030 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some embodiments, other techniques for learning the parameters of the AI model 1030 are used. The process of updating (or learning) the parameters over many iterations is referred to as training. In some embodiments, training is carried out iteratively until a convergence condition is met (e.g., a predefined maximum number of iterations has been performed, or the value outputted by the AI model 1030 is sufficiently converged with the desired target value), after which the AI model 1030 is considered to be sufficiently trained. The values of the learned parameters are then fixed and the AI model 1030 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 1030 typically involves further training the ML model on a number of data samples (which may be smaller in number/cardinality than those used to train the model initially) that closely target the specific task. For example, an AI model 1030 for generating natural language that has been trained generically on publicly available text corpora is, e.g., fine-tuned by further training using specific training samples. In some embodiments, the specific training samples are used to generate language in a certain style or a certain format. For example, the AI model 1030 is trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

In some embodiments, the language model uses a neural network (typically a DNN) to perform NLP tasks. A language model is trained to model how words relate to each other in a textual sequence, based on probabilities. In some embodiments, the language model contains hundreds of thousands of learned parameters, or in the case of a large language model (LLM) contains millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

Because GPT-type language models tend to have a large number of parameters, these language models are considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model is hosted by a computer system that includes a plurality of cooperating (e.g., cooperating via a network) computer systems that are in, for example, a distributed arrangement. Notably, a remote language model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real-time or near real-time) can require the use of a plurality of processors/cooperating computing devices as discussed above.

In some embodiments, inputs to an LLM are referred to as a prompt (e.g., command set or instruction set), which is a natural language input that includes instructions to the LLM to generate a desired output. In some embodiments, a computer system generates a prompt that is provided as input to the LLM via the LLM's API. As described above, the prompt is processed or pre-processed into a token sequence prior to being provided as input to the LLM via the LLM's API. A prompt includes one or more examples of the desired output, which provides the LLM with additional information to enable the LLM to generate output according to the desired output. Additionally or alternatively, the examples included in a prompt provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples is referred to as a zero-shot prompt.

In some embodiments, the llama2 is used as a large language model, which is a large language model based on an encoder-decoder architecture, and can simultaneously perform text generation and text understanding. The llama2 selects or trains proper pre-training corpus, pre-training targets and pre-training parameters according to different tasks and fields, and adjusts a large language model on the basis so as to improve the performance of the large language model under a specific scene.

In some embodiments, the Falcon40B is used as a large language model, which is a causal decoder-only model. During training, the model predicts the subsequent tokens with a causal language modeling task. The model applies rotational positional embeddings in the model's transformer model and encodes the absolution positional information of the tokens into a rotation matrix.

In some embodiments, the Claude is used as a large language model, which is an autoregressive model trained on a large text corpus unsupervised.

Computing Platform

Figure 11:
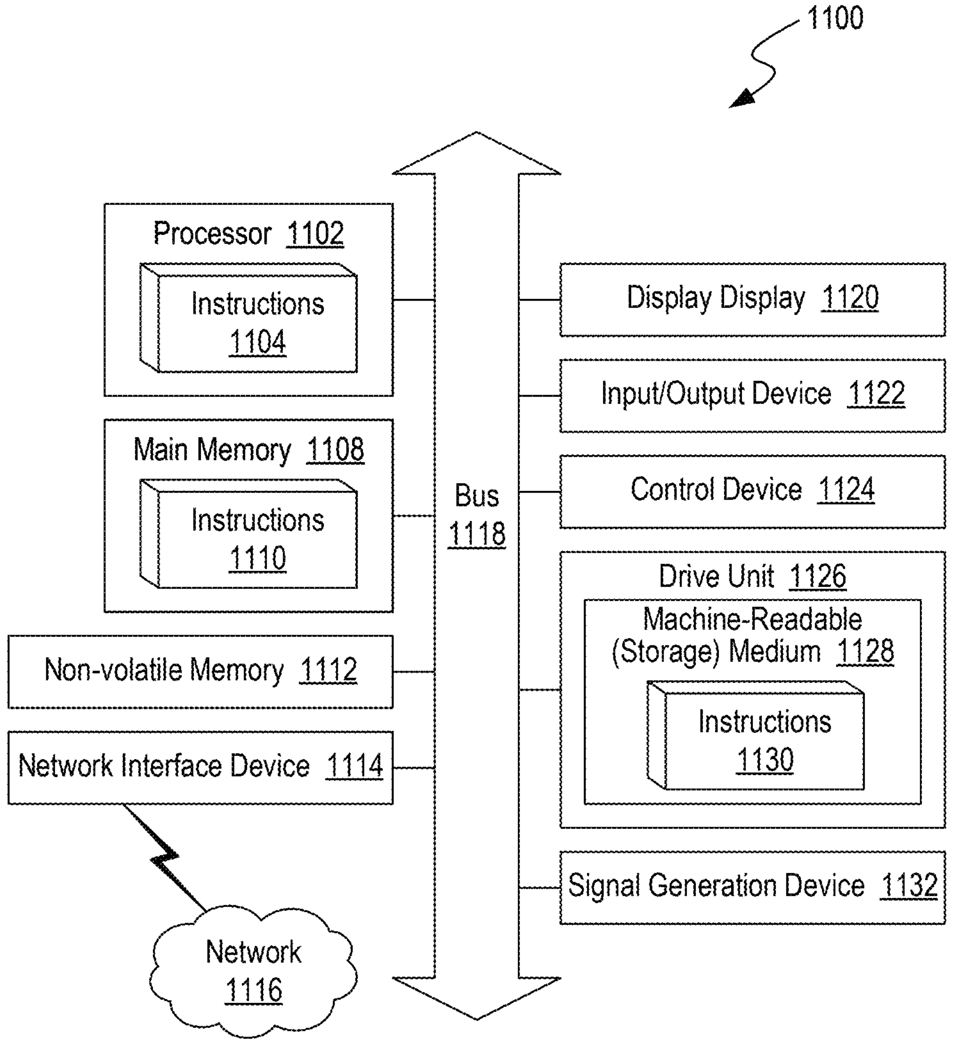
FIG. 11 is a block diagram illustrating an example computer system, in accordance with one or more embodiments.

FIG. 11 is a block diagram illustrating an example computer system 1100, in accordance with one or more embodiments. In some embodiments, components of the example computer system 1100 are used to implement the software platforms described herein. At least some operations described herein can be implemented on the computer system 1100.

In some embodiments, the computer system 1100 includes one or more central processing units ("processors") 1102, main memory 1106, non-volatile memory 1110, network adapters 1112 (e.g., network interface), video displays 1118, input/output devices 1120, control devices 1122 (e.g., keyboard and pointing devices), drive units 1124 including a storage medium 1126, and a signal generation device 1120 that are communicatively connected to a bus 1116. The bus 1116 is illustrated as an abstraction that represents one or more physical buses and/or point-to-point connections that are connected by appropriate bridges, adapters, or controllers. The bus 1116, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1194 bus (also referred to as "Firewire").

In some embodiments, the computer system 1100 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1100.

While the main memory 1106, non-volatile memory 1110, and storage medium 1126 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 1128. The term "machine-readable medium" and "storage medium" shall also be taken to include any medium that is capable of storing, encoding, or carrying a set of instructions for execution by the computer system 1100. In some embodiments, the non-volatile memory 1110 or the storage medium 1126 is a non-transitory, computer-readable storage medium storing computer instructions, which is executable by the one or more "processors" 1102 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1104, 1108, 1128) set at various times in various memory and storage devices in a computer device. When read and executed by the one or more processors 1102, the instruction(s) cause the computer system 1100 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 1110, floppy and other removable disks, hard disk drives, optical discs (e.g., compact disc read-only memory (CD-ROMS), digital versatile discs (DVDs)), and transmission-type media such as digital and analog communication links.

The network adapter 1112 enables the computer system 1100 to mediate data in a network 1114 with an entity that is external to the computer system 1100 through any communication protocol supported by the computer system 1100 and the external entity. The network adapter 1112 includes a network adapter card, a wireless network interface card, a router, an access point, a wireless router, a switch, a multi-layer switch, a protocol converter, a gateway, a bridge, a bridge router, a hub, a digital media receiver, and/or a repeater.

In some embodiments, the network adapter 1112 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 1000 illustrated and described in more detail with reference to FIG. 10.

CONCLUSION

Consequently, alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

We claim:

1. A system for real-time validation of generative artificial intelligence (AI) model operators using preloaded query context connected to independent AI models in generative AI-driven trivia gameplay, comprising:

a user interface that is communicatively connected to a generative AI model that is configured to generate a trivia response based on user input to the user interface;

a model superstructure between the user interface, the generative AI model, and an independent validation model, wherein the model superstructure facilitates the user input or the trivia response to the independent validation model and triggers the independent validation model upon satisfaction of a predetermined model-driven condition, wherein the independent validation model is provided a pre-loaded query context and configured to detect adherence by the user input or the trivia response to the predetermined model-driven condition directed by the pre-loaded query context; and a consensus module configured to receive an output of the independent validation model and deliver the user input or the trivia response to the generative AI model or the user interface, respectively, in response to detected adherence to the predetermined model-driven condition.

2. The system of claim 1, wherein in an event of a failed validation consensus for the user input, a game GUI signal is displayed on the user interface, wherein the game GUI signal signifies a need for a new user input.

3. The system of claim 1, wherein the model superstructure further comprises a plurality of independent validation models, wherein the consensus module further comprises simultaneously delivering the user input or the trivia response to the plurality of independent validation models and simultaneously triggering the plurality of independent validation models in parallel.

4. The system of claim 3, wherein each of the plurality of independent validation models is assigned a distinct pre-loaded query context.

5. The system of claim 3, wherein the consensus module employs a load-balancing algorithm to dynamically allocate sub-elements of the user input or the trivia response to multiple models among the plurality of independent validation models based on computational demand.

6. The system of claim 3, wherein the plurality of independent validation models includes at least one hallucination check, wherein the at least one hallucination check is configured to interrupt execution of a query midway to determine if the generative AI model has generated false data, and restart the query to verify if the independent validation model reproduces the false data.

7. The system of claim 3, wherein the plurality of independent validation models includes a profanity check, wherein the profanity check is configured to detect instances of profanity from the user input or the trivia response based on the pre-loaded query context, wherein the profanity check utilizes a lexical analysis engine and at least one context-aware filter, wherein the pre-loaded query context comprises a list of associated profane language markers.

8. A method for real-time validation of generative artificial intelligence (AI) model operators using preloaded query context in generative AI-driven trivia gameplay, comprising:

providing a user interface that is communicatively connected to a generative AI model, said generative AI model configured to generate a trivia response based on user input to the user interface;

interconnecting, via a model superstructure, the user interface, the generative AI model, and a plurality of independent validation models;

simultaneously triggering evaluations, by of the plurality of independent validation models in parallel via the model superstructure, of the user input or the trivia response to determine satisfaction of a set of corresponding predetermined model-driven conditions, said simultaneous triggering including:

assigning distinct pre-loaded query contexts to each of the plurality of independent validation models; and facilitating execution of the plurality of independent validation models simultaneously on the user input or the trivia response based on the distinct pre-loaded query contexts; and in response to a determination that each of the set of corresponding predetermined model-driven conditions is satisfied by a consensus module, delivering the user input or trivia response to the generative AI model or to the user interface, respectively.

9. The method of claim 8, wherein the plurality of independent validation models includes a localization check, wherein the localization check is configured to detect an indication of suitability of the trivia response for specific geographical locations based on the distinct pre-loaded query context, wherein the distinct pre-loaded query context comprises factors associated with a user's geographical location.

10. The method of claim 8, wherein the plurality of independent validation models includes an accuracy check based on the distinct pre-loaded query context, wherein the distinct pre-loaded query context is configured to evaluate an indication of correctness and authenticity of the trivia response.

11. The method of claim 8, wherein the plurality of independent validation models includes a user feedback check, wherein said user feedback check utilizes a set of feedback from users to assess an indication of quality and effectiveness of the trivia response.

12. The method of claim 8, wherein the plurality of independent validation models includes a difficulty level analysis check based on the distinct pre-loaded query context, wherein the distinct pre-loaded query context is configured to evaluate an indication of complexity of the trivia response for specific target audiences.

13. The method of claim 8, wherein in an event of a failed validation consensus for the trivia response generated by the generative AI model, a new trivia response is generated by the generative AI model and subjected to re-validation.

14. The method of claim 8, wherein at least one of the plurality of independent validation models utilizes machine learning techniques for training on a deny list of topics, wherein a machine learning model learns at least one pattern associated with the deny list of topics.

15. A system for real-time validation of generative artificial intelligence (AI) model operators using preloaded query context connected to independent AI models in generative AI-driven Ouija board gameplay, comprising:

a user interface that is communicatively connected to a generative AI model that is configured to generate a Ouija board response based on user input to the user interface;

a model superstructure interconnecting the user interface, the generative AI model, and a plurality of independent validation models, wherein the model superstructure is configured to simultaneously trigger evaluations, by the plurality of independent validation models in parallel via the model superstructure, of the user input or the Ouija board response to determine satisfaction of a set of corresponding predetermined model-driven conditions, wherein each of the plurality of independent validation models is assigned a distinct pre-loaded query context, wherein the model superstructure is further configured to facilitate execution of the plurality of independent validation models simultaneously on the user input or the Ouija board response based on the distinct pre-loaded query contexts; and a consensus module configured to deliver the user input or trivia response to the generative AI model or to the user interface, respectively, in response to a determination that each of the set of corresponding predetermined model-driven conditions is satisfied by the consensus module.

16. The system of claim 15, wherein the user interface comprises a visual or auditory signal on the user interface to indicate if the consensus module has failed for the user input.

17. The system of claim 15, wherein the plurality of independent validation models includes a jailbreak check, wherein the jailbreak check is configured to detect an indication of whether the user input is likely to induce profanity in the Ouija board response.

18. The system of claim 15, wherein the plurality of independent validation models includes a temporal relevance check, wherein the temporal relevance check assesses an indication of suitability of the Ouija board response in relation to whether a user selected deceased person is actually deceased.

19. The system of claim 15, wherein the plurality of independent validation models includes a format check, wherein the format check verifies that the user input or the Ouija board response adheres to specific formatting requirements.

20. The system of claim 15, wherein the plurality of independent validation models includes an accuracy check based on the distinct pre-loaded query context, wherein the distinct pre-loaded query context is configured to evaluate an indication of correctness and authenticity of the Ouija board response.

* * * * *